US012306581B2

(12) United States Patent
Kamikura et al.

(10) Patent No.: US 12,306,581 B2
(45) Date of Patent: May 20, 2025

(54) TONER

(71) Applicant: CANON KABUSHIKI KAISHA, Tokyo (JP)

(72) Inventors: Kenta Kamikura, Kanagawa (JP); Kozue Uratani, Shizuoka (JP); Kosuke Fukudome, Tokyo (JP); Tetsuya Kinumatsu, Shizuoka (JP); Takuya Mizuguchi, Shizuoka (JP); Yuta Komiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 700 days.

(21) Appl. No.: 17/643,525

(22) Filed: Dec. 9, 2021

(65) Prior Publication Data

US 2022/0214630 A1 Jul. 7, 2022

(30) Foreign Application Priority Data

Dec. 25, 2020 (JP) ................................ 2020-217539
Aug. 31, 2021 (JP) ................................ 2021-141831

(51) Int. Cl.
*G03G 9/087* (2006.01)
*G03G 9/097* (2006.01)

(52) U.S. Cl.
CPC ..... *G03G 9/09733* (2013.01); *G03G 9/08711* (2013.01)

(58) Field of Classification Search
CPC ....................... G03G 9/08711; G03G 9/08782
See application file for complete search history.

(56) References Cited

U.S. PATENT DOCUMENTS 8,603,712 B2 12/2013 Aoki et al.
8,741,519 B2 6/2014 Watanabe et al.
8,785,101 B2 7/2014 Kaya et al.
8,828,639 B2 9/2014 Kamikura et al.
8,846,284 B2 9/2014 Kinumatsu et al.
8,918,035 B2 12/2014 Hasegawa et al.
9,034,549 B2 5/2015 Shiotari et al.
9,040,216 B2 5/2015 Fukudome et al.
9,116,448 B2 8/2015 Terauchi et al.
9,134,637 B2 9/2015 Hotta et al.
9,141,012 B2 9/2015 Moribe et al.
9,244,371 B2 1/2016 Suzumura et al.
9,256,148 B2 2/2016 Fujikawa et al.
9,261,806 B2 2/2016 Moribe et al.
9,285,697 B2 3/2016 Fukudome et al.
9,304,422 B2 4/2016 Matsui et al.
9,309,349 B2 4/2016 Watanabe et al.
9,348,246 B2 5/2016 Magome et al.
9,354,545 B2 5/2016 Matsui et al.
9,377,708 B2 6/2016 Magome et al.
9,423,711 B2 8/2016 Uratani et al.
9,429,860 B2 8/2016 Kinumatsu et al.
9,442,416 B2 9/2016 Magome et al.
9,470,993 B2 10/2016 Nishikawa et al.
9,588,450 B2 3/2017 Tsuda et al.
9,594,323 B2 3/2017 Fujikawa et al.
9,606,462 B2 3/2017 Nomura et al.
9,625,842 B2 4/2017 Uratani et al.
9,625,844 B2 4/2017 Kaya et al.
9,658,546 B2 5/2017 Tanaka et al.
9,658,554 B2 5/2017 Kinumatsu et al.
9,798,256 B2 10/2017 Kosaki et al.
9,798,262 B2 10/2017 Toyoizumi et al.
9,804,514 B2 10/2017 Suzumura et al.
9,811,016 B2 11/2017 Aoki et al.
9,823,595 B2 11/2017 Toyoizumi et al.
9,841,692 B2 12/2017 Hasegawa et al.
9,857,707 B2 1/2018 Tsuda et al.
9,857,713 B2 1/2018 Kosaki et al.
9,869,943 B2 1/2018 Aoki et al.
9,880,478 B2 1/2018 Shimano et al.
9,897,932 B2 2/2018 Hotta et al.
9,952,523 B2 4/2018 Shimano et al.
9,964,874 B2 5/2018 Suzumura et al.
9,971,263 B2 5/2018 Fukudome et al.

(Continued)

FOREIGN PATENT DOCUMENTS

| | | | |
|---|---|---|---|
| CN | 103765318 | A | 4/2014 |
| JP | 2007-322477 | A | 12/2007 |
| JP | 2008-70839 | A | 3/2008 |
| JP | 2009-258538 | A | 11/2009 |
| JP | 2010-145552 | A | 7/2010 |
| JP | 2012-78628 | A | 4/2012 |
| JP | 2014-35506 | A | 2/2014 |
| JP | 2015-52643 | A | 3/2015 |
| JP | 2015-72371 | A | 4/2015 |
| JP | 2019-86764 | A | 6/2019 |
| JP | 2020-52153 | A | 4/2020 |

OTHER PUBLICATIONS

Robert F. Fedors, "A Method for Estimating Both the Solubility Parameters and Molar Volumes of Liquids", Polym. Eng, Sci., vol. 14, No. 2 (1974) 147-54.

(Continued)

*Primary Examiner* — Peter L Vajda
(74) *Attorney, Agent, or Firm* — VENABLE LLP

(57) ABSTRACT

The present disclosure provides a toner that achieves both high image gloss and high image loadability. The toner includes a toner particle that includes: a styrene-acrylic resin having a unit represented by the formula (1); and an ester compound A, wherein the ester compound A is an ester compound represented by the formula (2) or the formula (3): and an absolute value of a difference between SPb $(J/cm^3)^{1/2}$ that is an SP value of the styrene-acrylic resin and SPw1 $(J/cm^3)^{1/2}$ that is an SP value of the ester compound A is 1.00 or larger and 2.00 or smaller.

5 Claims, No Drawings

(56) References Cited

U.S. PATENT DOCUMENTS

| | | | |
|---|---|---|---|
| 10,101,683 B2 | 10/2018 | Nishikawa et al. | |
| 10,197,934 B2 | 2/2019 | Matsui et al. | |
| 10,228,627 B2 | 3/2019 | Nagashima et al. | |
| 10,228,630 B2 | 3/2019 | Mizuguchi et al. | |
| 10,241,430 B2 | 3/2019 | Kimura et al. | |
| 10,289,016 B2 | 5/2019 | Fukudome et al. | |
| 10,295,921 B2 | 5/2019 | Ohmori et al. | |
| 10,303,074 B2 | 5/2019 | Yamawaki et al. | |
| 10,310,396 B2 | 6/2019 | Kamikura et al. | |
| 10,310,397 B2 | 6/2019 | Sano et al. | |
| 10,338,487 B2 | 7/2019 | Kamikura et al. | |
| 10,345,726 B2 | 7/2019 | Nakamura et al. | |
| 10,353,308 B2 | 7/2019 | Hatakeyama et al. | |
| 10,401,750 B2 | 9/2019 | Nakamura et al. | |
| 10,409,180 B2 | 9/2019 | Koji et al. | |
| 10,429,757 B2 | 10/2019 | Yoshida et al. | |
| 10,503,090 B2 | 12/2019 | Tominaga et al. | |
| 10,539,893 B2 | 1/2020 | Tanaka et al. | |
| 10,539,899 B2 | 1/2020 | Nakamura et al. | |
| 10,545,420 B2 | 1/2020 | Kinumatsu et al. | |
| 10,545,422 B2 | 1/2020 | Yamawaki et al. | |
| 10,551,758 B2 | 2/2020 | Tanaka et al. | |
| 10,578,990 B2 | 3/2020 | Tsuda et al. | |
| 10,635,010 B2 | 4/2020 | Kamikura et al. | |
| 10,698,327 B2 | 6/2020 | Nagashima et al. | |
| 10,732,530 B2 | 8/2020 | Matsui et al. | |
| 10,782,623 B2 | 9/2020 | Yoshiba et al. | |
| 10,845,722 B2 | 11/2020 | Nishikawa et al. | |
| 10,859,933 B2 | 12/2020 | Kinumatsu et al. | |
| 10,877,387 B2 | 12/2020 | Fukudome et al. | |
| 10,877,388 B2 | 12/2020 | Aoki et al. | |
| 10,877,389 B2 | 12/2020 | Kamikura et al. | |
| 10,895,815 B2 | 1/2021 | Kamikura et al. | |
| 11,003,103 B2 | 5/2021 | Kinumatsu et al. | |
| 11,092,905 B2 | 8/2021 | Fukudome et al. | |
| 11,099,493 B2 | 8/2021 | Komiya et al. | |
| 11,112,708 B2 | 9/2021 | Uratani et al. | |
| 11,169,458 B2 | 11/2021 | Toyoizumi et al. | |
| 11,175,600 B2 | 11/2021 | Uchiyama et al. | |
| 11,181,839 B2 | 11/2021 | Yamashita et al. | |
| 11,181,840 B2 | 11/2021 | Nagata et al. | |
| 11,181,844 B2 | 11/2021 | Nagaoka et al. | |
| 11,181,846 B2 | 11/2021 | Kinumatsu et al. | |
| 2008/0038657 A1 | 2/2008 | Yamazaki et al. | |
| 2014/0205944 A1 | 7/2014 | Masuda | |
| 2015/0064616 A1 | 3/2015 | Sekiguchi et al. | |
| 2015/0185658 A1 | 7/2015 | Wakabayashi et al. | |
| 2016/0378003 A1 | 12/2016 | Arimura et al. | |
| 2019/0137900 A1* | 5/2019 | Nakagawa | G03G 9/08797 |
| 2020/0142329 A1* | 5/2020 | Yamawaki | G03G 9/08711 |
| 2020/0356019 A1 | 11/2020 | Matsui et al. | |
| 2020/0409282 A1 | 12/2020 | Unno et al. | |
| 2021/0026261 A1 | 1/2021 | Ogaki et al. | |
| 2021/0026262 A1 | 1/2021 | Kenmoku et al. | |
| 2021/0026264 A1 | 1/2021 | Kamikura et al. | |
| 2021/0026265 A1 | 1/2021 | Kamikura et al. | |
| 2021/0080846 A1 | 3/2021 | Mizuguchi et al. | |
| 2021/0356878 A1 | 11/2021 | Mizuguchi et al. | |

OTHER PUBLICATIONS

U.S. Appl. No. 17/519,938, Yuta Komiya, filed Nov. 5, 2021.
U.S. Appl. No. 17/520,044, Dai Nozaki, filed Nov. 5, 2021.
U.S. Appl. No. 17/643,949, Kozue Uratani, filed Dec. 13, 2021.

* cited by examiner

TONER

BACKGROUND OF THE INVENTION

Field of the Invention

The present disclosure relates to a toner that is used for an electrophotography, an electrostatic recording method and a recording method using a toner jet recording method.

Description of the Related Art

In recent years, image formation in the electrophotographic method has expanded the application area from office to commercial printing. There are various image qualities required of use in commercial printing, but, in particular, in the field of photographic printing, it is required to output images having a high printing rate and a high gloss at a high speed.

In order to output the images having the high printing rate and the high gloss at the high speed, toner is required to have excellent melting properties of sufficiently lowering the viscosity even by heating in a short period of time.

In order to respond to such requirement, various studies have been made on binder resins to be used in the toner. Among the binder resins, as a binder resin having excellent melting properties, a styrene-acrylic resin incorporating a long-chain alkyl (meth)acrylate has been studied.

In Japanese Patent Application Laid-Open No. 2014-035506, a toner for developing an electrostatic charge image is disclosed, which includes: a styrene-acrylic resin that has a structural unit derived from an alkyl(meth)acrylate monomer having an alkyl group having 8 or more and 22 or less carbon atoms, and a structural unit derived from an alkyl (meth)acrylate monomer having an alkyl group having 1 or more and 7 or less carbon atoms, as a binder resin; and a crystal ester compound. In addition, it is also disclosed that pentaerythritol tetrabehenate can be used as a wax. In Japanese Patent Application Laid-Open No. 2014-035506, a styrene-acrylic resin is used to control the affinity between the crystal ester compound and the binder resin, and thereby improve the melting properties of the toner. However, it has become clear that when the toner of Japanese Patent Application Laid-Open No. 2014-035506 is used to continuously output images having the high printing rate, the images stick to each other and there is a problem in an image loadability. In addition, also when pentaerythritol tetrabehenate is used as the wax in the toner of Japanese Patent Application Laid-Open No. 2014-035506, improvement in the image loadability is not observed.

Meanwhile, in Japanese Patent Application Laid-Open No. 2007-322477, a binder resin for toner is disclosed, which includes: a vinyl-based copolymer formed by copolymerization of monomer components that contain 10 to 30% by mass of an alkyl(meth)acrylate monomer having an alkyl group having 8 or more carbon atoms, and 0.2 to 2% by mass of an alkyldiol diacrylate monomer having an alkylene group having 6 or more carbon atoms; and a Fischer-Tropsch wax. In the binder resin described in Japanese Patent Application Laid-Open No. 2007-322477, the viscosity of the image surface after fixing is enhanced due to a cross-linked structure that is formed by the alkyl diol acrylate monomer having 6 or more carbon atoms, and the sticking of the images to each other is suppressed. However, in the method described in Japanese Patent Application Laid-Open No. 2007-322477, there has been a problem that a sufficient image gloss cannot be obtained in a high-speed process.

As described above, the toner that uses the styrene-acrylic resin having a long-chain alkyl acrylate incorporated therein as the binder resin obtains a high image gloss, but has a problem in the loadability of the image, and it has been required of the toner to achieve both at a high level.

SUMMARY OF THE INVENTION

The present disclosure provides a toner that achieves both the high image gloss and the image loadability.

The present disclosure relates to a toner including a toner particle that includes: a styrene-acrylic resin having a unit represented by the following formula (1); and an ester compound A, wherein the ester compound A is an ester compound represented by the following formula (2) or the following formula (3): and an absolute value of a difference between SPb $(J/cm^3)^{1/2}$ and SPw1 $(J/cm^3)^{1/2}$ is 1.00 or larger and 2.00 or smaller, the SPb $(J/cm^3)^{1/2}$ being an SP value of the styrene-acrylic resin, the SPw1 $(J/cm^3)^{1/2}$ being an SP value of the ester compound A, (1)

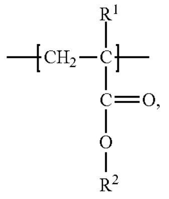

wherein $R^1$ represents a hydrogen atom or a methyl group, and $R^2$ represents a straight-chain alkyl group having 10 to 14 carbon atoms, and (2)

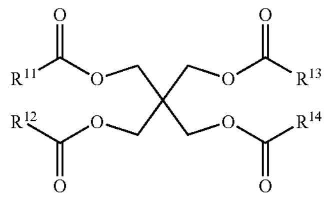

(3)

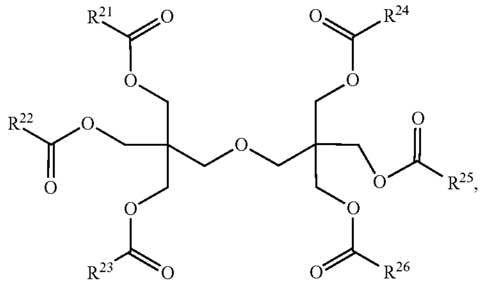

wherein $R^{11}$ to $R^{14}$ and $R^{21}$ to $R^{26}$ each independently represent a straight-chain alkyl group having 15 to 21 carbon atoms.

Further features of the present disclosure will become apparent from the following description of exemplary embodiments.

DESCRIPTION OF THE EMBODIMENTS

Preferred embodiments of the present disclosure will now be described in detail (in accordance with the accompanying drawings).

In the present disclosure, the description of a numerical range with "to" between two numerals means a numerical range including the endpoints as a lower limit and an upper limit unless otherwise specified.

The toner of the present disclosure is a toner including a toner particle that includes: a styrene-acrylic resin having a unit represented by the following formula (1); and an ester compound A, wherein the ester compound A is an ester compound represented by the formula (2) or the formula (3): and an absolute value of a difference between SPb $(J/cm^3)^{1/2}$ and SPw1 $(J/cm^3)^{1/2}$ is 1.00 or larger and 2.00 or smaller, the SPb $(J/cm^3)^{1/2}$ being an SP value of the styrene-acrylic resin, the SPw1 $(J/cm^3)^{1/2}$ being an SP value of the ester compound A, (1)

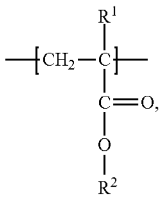

wherein $R^1$ represents a hydrogen atom or a methyl group, and $R^2$ represents a straight-chain alkyl group having 10 to 14 carbon atoms, and (2)

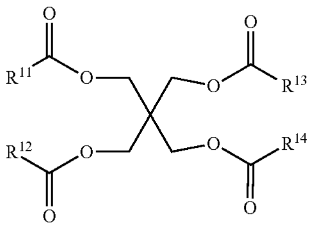

(3)

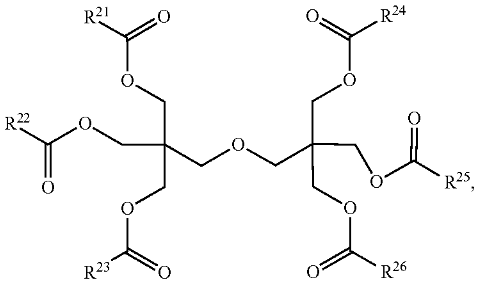

wherein $R^{11}$ to $R^{14}$ and $R^{21}$ to $R^{26}$ each independently represent a straight-chain alkyl group having 15 to 21 carbon atoms.

The reason why the toner of the present disclosure can achieve both the high image gloss and the image loadability is not clear, but the present inventors assume the reason to be as follows.

In the unit represented by the formula (1) (hereinafter also referred to as "long-chain acrylate moiety"), the motility of the molecular chain is high. Because of this, the resin having the long-chain acrylate moiety has a high degree of freedom at the time of melting, and the viscosity tends to easily become low. Therefore, when the resin is used as a binder resin of toner, the image surfaces after fixing tend to easily become smooth, and high image gloss can be obtained. On the other hand, a molecular chain of the long-chain acrylate moiety that exists on the image surface after fixing has high motility, and the portion which comes in contact with paper output next tends to easily stick to the paper, and, in particular, when images having a high printing rate have been output at a high speed, the long-chain acrylate moiety causes sticking of the images in some cases.

In general, in order to suppress the sticking of the image, it is effective to reduce the motility of molecular chains. Specifically, there is known a method of reducing the motility of the molecular chain by crosslinking between the main chains of the resin with a crosslinking agent.

However, a side chain of a resin having the long-chain acrylate moiety has high motility, and accordingly, even if the main chains are crosslinked, the motility of the side chain does not decrease, and sufficient image loadability cannot be obtained in some cases. In addition, in the case where the sticking of the image is suppressed by crosslinking between the main chains of the resins, the motility of the molecular chain decreases regardless of the temperature range, and accordingly, it tends to be easily obstructed that the viscosity at the time of fixing decreases. Therefore, it has been found that the image gloss and the image loadability have a trade-off relationship.

In order to resolve the trade-off relationship, the structure is considered to be effective in which the degree of freedom of the molecular chain is high at the time of fixing and the degree of freedom of the molecular chain decreases after fixing.

In the present disclosure, the above problem is solved by the toner that includes: a specific styrene-acrylic resin having a long-chain acrylate moiety; and a specific ester compound A. The long-chain acrylate moiety is a unit having a straight-chain alkyl group having 10 or more and 14 or less carbon atoms, and the ester compound A is an ester compound having 4 to 6 straight-chain alkyl groups having 15 or more and 21 or less carbon atoms in the molecule. In addition, an absolute value of a difference between SPb $(J/cm^3)^{1/2}$ and SPw1 $(J/cm^3)^{1/2}$ is 1.00 or larger and 2.00 or smaller, the SPb $(J/cm^3)^{1/2}$ being an SP value of the styrene-acrylic resin, the SPw1 $(J/cm^3)^{1/2}$ being an SP value of the ester compound A, In the above structure, the SP values of the styrene-acrylic resin and the ester compound A are controlled, and thereby the affinity between the styrene-acrylic resin and the ester compound A increases. Therefore, the straight-chain alkyl group existing in the ester compound A can interact with the straight-chain alkyl group existing in the long-chain acrylate moiety. The straight-chain alkyl group existing in the long-chain acrylate moiety and the straight-chain alkyl group existing in the ester compound A have structures similar to each other, and accordingly the straight-chain alkyl groups have a structure in which the straight-chain alkyl groups are oriented to each other at room temperature, and the motility of the straight-chain alkyl group is low. In addition, the ester compound A has a plurality of straight-chain alkyl groups, and accordingly, the styrene-acrylic resin forms a pseudo cross-linked structure via the ester compound A, and thereby the motility of the main chain also decreases. On the other hand, at a high temperature of the melting point or higher of the ester compound A, the orientation of the straight-chain alkyl groups is released, and the motilities of the straight-chain alkyl groups are high. As described above, according to the constitution of the present disclosure, the motility of the straight-chain alkyl group existing in the long-chain acrylate moiety can be high at high temperature, and the motility of the straight-chain alkyl group existing in the long-chain acrylate moiety can be low at normal temperature. In other words, the motility of the straight-chain alkyl group existing in the long-chain acrylate moiety can be controlled by the temperature.

As described above, in the present disclosure, at the time of fixing at which the temperature becomes high, the motility of the straight-chain alkyl group existing in the long-chain acrylate moiety is high, and accordingly, the viscosity of the whole resin becomes low. Therefore, a high image gloss can be obtained. On the other hand, when the temperature is lowered after fixing, the straight-chain alkyl group existing in the long-chain acrylate moiety is oriented with the straight-chain alkyl group existing in the ester compound A, and thereby the motilities of both the straight-chain alkyl group and the main chain decrease. Therefore, the sticking of the images to each other can be suppressed, and the image loadability is enhanced.

Subsequently, the constitution of the present disclosure will be described in more detail below.

<Binder Resin>

The binder resin contained in the toner particle contains the styrene-acrylic resin having a unit represented by the formula (1).

(1)

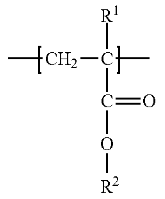

Due to the styrene-acrylic resin contained in the binder resin, the viscosity at the time of fixing can be lowered, and the image gloss is enhanced. In addition, due to combination with an ester compound A which will be described later, the sticking of the image can be suppressed, and the image loadability is enhanced.

In the formula (1), $R^1$ is a hydrogen atom or a methyl group. In addition, in the formula (1), $R^2$ is a straight-chain alkyl group having 10 to 14 carbon atoms. Due to the $R^2$ which is the straight-chain alkyl group, an effect of reducing the viscosity of the resin can be obtained, and in addition, the straight-chain alkyl group can be oriented with a straight-chain alkyl group in the ester compound A. Therefore, the effects of enhancing the image gloss and enhancing the image loadability can be obtained. In addition, when the number of carbon atoms is 10 or more, it becomes easy to obtain the effect of reducing the viscosity of the resin, and the image gloss is enhanced. When the number of carbon atoms is 14 or less, the orientation of the straight-chain alkyl group in the resin with the straight-chain alkyl group in the ester compound A occurs preferentially to the orientation of the straight-chain alkyl groups in the resin with each other, and accordingly the image loadability is enhanced. It is more preferable that the number of carbon atoms of the straight-chain alkyl group represented by $R^2$ is 12.

It is preferable that the styrene-acrylic resin is a styrene-acrylic resin which has 1 to 15% by mass of the unit represented by the formula (1) based on total mass of the styrene-acrylic resin. When the content of the unit represented by the formula (1) is 1 to 15% by mass, a sufficient effect of reducing the viscosity is obtained, and thereby the image gloss is enhanced. In addition, the orientation of the straight-chain alkyl groups with each other is suppressed, which exist in the long-chain acrylate moiety, and accordingly the image loadability is enhanced. It is more preferable that the styrene-acrylic resin is a styrene-acrylic resin which contains 2 to 10% by mass of the unit represented by the formula (1) based on total mass of the styrene-acrylic resin.

The styrene-acrylic resin contains a unit represented by the following formula (7) other than the unit represented by the formula (1). It is preferable for the styrene-acrylic resin to contain the unit represented by the formula (7) in an amount of 1 to 99% by mass, and is more preferable to contain the unit in an amount of 50 to 90% by mass.

(7)

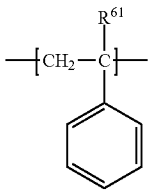

In formula (7), $R^{61}$ represents a hydrogen atom or a methyl group.

When the SP value of the styrene-acrylic resins is represented by SPb $(J/cm^3)^{1/2}$, it is preferable that SPb is 19.50 or larger and 20.40 or smaller, from the viewpoint that it becomes easy to enhance the affinity with the ester compound A which will be described later. It is more preferable that the SPb is 19.80 or larger and 20.10 or smaller. The SPb can be controlled by a type, amount, and the like of the units constituting the styrene-acrylic resin.

It is preferable that the weight average molecular weight of the styrene-acrylic resin is 10000 or more and 500000 or less. The weight average molecular weight can be controlled by a reaction temperature, an amount of an initiator, and the like at the time when the styrene-acrylic resin is produced.

It is preferable that the glass transition temperature of the styrene-acrylic resin is 40° C. or higher and 60° C. or lower. The glass transition temperature can be controlled by the type, amount, and the like of the units constituting the styrene-acrylic resin.

It is preferable that the binder resin contained in the toner particle contains 80% by mass or more of the styrene-acrylic resin. In addition, the binder resin contained in the toner particle can employ conventionally known resins together with the styrene-acrylic resin without particular limitation, if necessary. Examples of the binder resin that can be used together with the styrene-acrylic resin include vinyl resins other than the styrene-acrylic resin, polyester resins, polyurethane resins and polyamide resins.

<Polymerizable Monomer>

The styrene-acrylic resin may be obtained by polymerization. Examples of a polymerizable monomer that forms the unit represented by the formula (1) of the styrene-acrylic resin include acrylic acid esters and methacrylic acid esters such as decyl acrylate, decyl methacrylate, lauryl acrylate, lauryl methacrylate, myristyl acrylate and myristyl methacrylate. Among the esters, lauryl acrylate or lauryl methacrylate is preferably used.

In addition, polymerizable monomers that form the unit represented by the formula (7) of the styrene-acrylic resin are styrene and α-methyl styrene. Between the styrene and the α-methyl styrene, the styrene is preferably used.

The styrene-acrylic resin may have a unit derived from a conventionally known polymerizable monomer without particular limitation, in addition to the units represented by the formula (1) and the formula (7). Examples of the polymerizable monomer include: monofunctional monomers having one polymerizable unsaturated bond in the molecule, which include acrylic acid esters such as methyl acrylate and n-butyl acrylate (n-butyl acrylate); methacrylate esters such as methyl methacrylate, 2-hydroxyethyl methacrylate, t-butyl methacrylate, and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic acid anhydride; nitrile-based vinyl monomers such as acrylonitrile; halogen-based vinyl monomers such as vinyl chloride; and nitro-based vinyl monomers such as nitrostyrene; and polyfunctional monomers that have a plurality of polymerizable unsaturated bonds in the molecule, such as divinylbenzene, 1,6-hexanediol diacrylate, 1,9-nonanediol diacrylate, and trimethylolpropane tri(meth)acrylate. Among the monomers, an acrylic acid ester or a methacrylic acid ester is preferably used, and n-butyl acrylate is more preferably used.

<Ester Compound A>

The toner particle includes an ester compound A represented by formula (2) or formula (3).

(2)

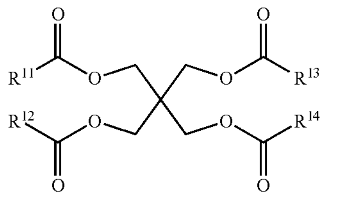

(3)

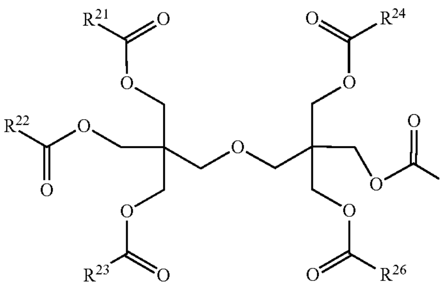

In formulas (2) and (3), $R^{11}$ to $R^{14}$ and $R^{21}$ to $R^{26}$ each independently represent a straight-chain alkyl group having 15 to 21 carbon atoms.

Due to the combination of the ester compound A and the styrene-acrylic resin, the sticking of the images can be suppressed, and the image loadability can be enhanced.

When the SP value of the ester compound A is defined as SPw1 $(J/cm^3)^{1/2}$, an absolute value of a difference between SPb $(J/cm^3)^{1/2}$ and SPw1 $(J/cm^3)^{1/2}$ is 1.00 or larger and 2.00 or smaller, the SPb $(J/cm^3)^{1/2}$ being an SP value of the styrene-acrylic resin, the SPw1 $(J/cm^3)^{1/2}$ being an SP value of the ester compound A. When the absolute value of the difference is 1.00 or larger and 2.00 or smaller, the affinity between the ester compound A and the styrene-acrylic resins increases, and the ester compound A can interact with the styrene-acrylic resin; and thereby the image loadability is enhanced. The absolute value of the difference between SPw1 and SPb is more preferably 1.50 or larger and 1.90 or smaller. On the other hand, when the absolute value of the difference between SPw1 and SPb is smaller than 1.00, the affinity between the ester compound A and the styrene-acrylic resin is too high, and accordingly the ester compound A does not separate at the time of fixing; and there is a case where the effect of reducing the viscosity becomes insufficient. In addition, when the absolute value of the difference between SPw1 and SPb exceeds 2.00, the ester compound A and the styrene-acrylic resin do not interact with each other, and accordingly, the effect of enhancing the image loadability cannot be obtained. Because of this, the SPw1 is preferably 18.00 or larger and 18.50 or smaller. More preferably, SPw1 is 18.10 or larger and 18.40 or smaller. The SPw1 can be controlled by the number of carbon atoms of the straight-chain alkyl groups and the number of ester bonds, which exist in the ester compound A.

When the number of carbon atoms of the straight-chain alkyl groups existing in the ester compound A is represented by C1, and the number of carbon atoms of the straight-chain alkyl groups existing in the unit represented by the formula (1) is represented by C2, it is preferable that satisfy the following Expression (a) is satisfied.

$$4 \le C1 - C2 \le 10 \quad \text{(a)}$$

When the C1 and the C2 satisfy the Expression (a), even in the case where the ester compound A is oriented with the styrene-acrylic resin before fixing, it is easy for the orientation to be released in a process of temperature rising at the time of fixing, and the effect of lowering the viscosity can be sufficiently obtained. Therefore, it becomes easy for the effect of enhancing the image gloss to be obtained. In addition, it becomes easy for the orientation to occur at the time of temperature fall, the image loadability is further enhanced. It is more preferable that the C1 and the C2 satisfy the following Expression (a').

$$6 \le C1 - C2 \le 10 \quad \text{(a')}$$

It is preferable that the ester compound A is an ester compound represented by the formula (2') or the formula (3').

(2')

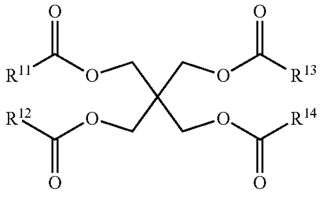

-continued (3')

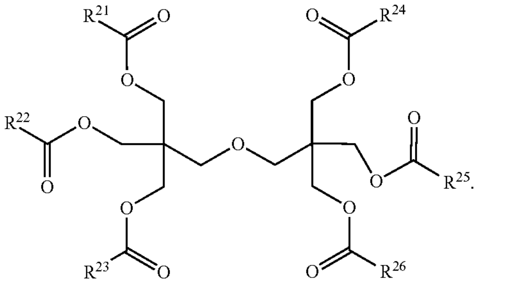

In the formula (2') and the formula (3'), $R^{11}$ to $R^{14}$ and $R^{21}$ to $R^{26}$ each independently represent a straight-chain alkyl group having 17 to 21 carbon atoms.

When the ester compound A is the ester compound represented by the formula (2') or the formula (3'), the ester compound A is partially separated at the time of fixing and functions as a release agent, and accordingly, the releasability of the image is enhanced. In addition, it is more preferable that the ester compound A is an ester compound represented by the formula (2'). The ester compound represented by the formula (2') has high motility, and the dispersibility of the ester compound in the image is enhanced in a period from the fixing time to the temperature falling time. Therefore, the styrene-acrylic resin can more uniformly form a pseudo cross-linked structure via the ester compound represented by the formula (2'). Because of this, the uniformity of the image gloss is enhanced.

Examples of the ester compound A include pentaerythritol tetrapalmitate, pentaerythritol tetrastearate, pentaerythritol tetraeicosanoate, pentaerythritol tetrabehenate, dipentaerythritol hexapalmitate, dipentaerythritol hexastearate, dipentaerythritol hexaeicosanoate, and dipentaerythritol hexabehenate.

It is preferable for the melting point of the ester compound A to be 70° C. or higher and 90° C. or lower, is more preferable to be 75° C. or higher and 90° C. or lower, and is further preferable to be 75° C. or higher and 85° C. or lower.

It is preferable for the molecular weight of the ester compound A to be 1000 or more and 2200 or less, and is more preferable to be 1200 or more and 2200 or less.

It is preferable for the content of the ester compound A to be 1.0 part by mass or more and 20.0 parts by mass or less, is more preferable to be 2.0 parts by mass or more and 15.0 parts by mass or less, and is further preferable to be 3.0 parts by mass or more and 12.0 parts by mass or less, with respect to 100.0 parts by mass of the binder resin contained in the toner particle.

<Ester Compound B>

It is preferable that the toner particle includes such an ester compound B as to be represented by the following formula (4), formula (5) or formula (6) and that the absolute value of the difference between SPb $(J/cm^3)^{1/2}$ and SPw2 $(J/cm^3)^{1/2}$ is 2.10 or smaller, the SPb $(J/cm^3)^{1/2}$ being an SP value of the styrene-acrylic resin, the SPw2 $(J/cm^3)^{1/2}$ being an SP value of the ester compound B, (4)

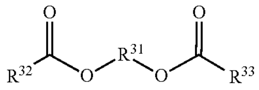

-continued (5)

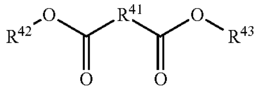

(6)

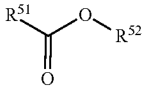

In Formula (4), Formula (5) and Formula (6), $R^{31}$ and $R^{41}$ each independently represent an alkylene group having 2 to 8 carbon atoms, and $R^{32}$, $R^{33}$, $R^{42}$, $R^{43}$, $R^{51}$ and $R^{52}$ each independently represent a straight-chain alkyl group having 14 to 24 carbon atoms.

The ester compound B has high compatibility with the styrene-acrylic resin, and accordingly the effect of reducing the viscosity can be obtained at a lower temperature. Therefore, even when the toner is fixed at the lower temperature, a high image gloss can be obtained.

Examples of the chemical compound represented by the formula (4) include ethylene glycol dipalmitate, ethylene glycol distearate, ethylene glycol dieicosanoate, ethylene glycol dibehenate, ethylene glycol ditetracosanoate, butanediol distearate, butanediol dibehenate, hexanediol distearate, hexanediol dibehenate, octanediol distearate, and octanediol dibehenate. Examples of the chemical compound represented by the formula (5) include distearyl succinate, dibehenyl succinate, distearyl adipate, dibehenyl adipate, distearyl suberate, dibehenyl suberate, distearyl sebacate, and dibehenyl sebacate. Examples of the chemical compound represented by the formula (6) include palmityl palmitate, stearyl palmitate, behenyl palmitate, palmityl stearate, stearyl stearate, behenyl stearate, palmityl behenate, stearyl behenate, and behenyl behenate.

It is preferable that the ester compound B is an ester compound represented by the formula (4) or the formula (5), because it is easy for the ester compound to enhance the compatibility with the styrene-acrylic resin having the unit represented by the formula (1). The ester compound represented by the formula (4) or the formula (5) has a straight-chain structure, and accordingly exhibits sharp melting properties; and has a plurality of ester bonds in the molecule, and thereby tends to easily control the difference in the SP value from the styrene-acrylic resin. Therefore, the effect of lowering the viscosity of the toner is further enhanced.

It is more preferable that the ester compound B is an ester compound represented by the formula (4') or the formula (5').

(4')

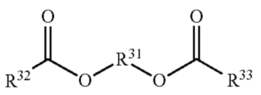

(5')

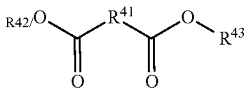

In the formula (4') and the formula (5'), $R^{31}$ and $R^{41}$ represent an ethylene group, and $R^{32}$, $R^{33}$, $R^{42}$ and $R^{43}$ each independently represent a straight-chain alkyl group having 16 to 22 carbon atoms.

It is preferable that the absolute value of the difference between SPb $(J/cm^3)^{1/2}$ and SPw2 $(J/cm^3)^{1/2}$ is 2.10 or smaller. When the absolute value of the difference between the SPb and the SPw2 is 2.10 or smaller, it becomes easy for the ester compound B to be compatible with the styrene-acrylic resin, and accordingly, a high image gloss can be obtained even when the toner is fixed at low temperature. It is more preferable that the absolute value of the difference between the SPb and the SPw2 is 2.00 or smaller.

It is preferable that the SPw2 is 17.90 or larger and 18.50 or smaller, from the viewpoint that it is easy to enhance the affinity with the styrene-acrylic resin. More preferably, the SPw2 is 18.00 or larger and 18.20 or smaller.

In addition, it is preferable that the SPw2 is lower than the SPw1. When the SPw2 is lower than the SPw1, the straight-chain alkyl group existing in the long-chain acrylate moiety is preferentially oriented with the ester compound A instead of the ester compound B at the time of the temperature fall after fixing, and accordingly, it becomes easier to obtain the effect of enhancing the image loadability. The SPw2 can be controlled by the number of carbon atoms of the straight-chain alkyl group and the number of ester bonds, which exist in the ester compound B.

It is preferable for the melting point of the ester compound B to be 65° C. or higher and 90° C. or lower, and is more preferable to be 70° C. or higher and 85° C. or lower.

It is preferable that the melting point of the ester compound B is lower than the melting point of the ester compound A. When the melting temperature of the ester compound B is lower than the melting temperature of the ester compound A, the ester compound B is melted first in the temperature rising process at the time of fixing, and accordingly, the effect of reducing the viscosity is enhanced; and in the temperature falling process after the fixing, the motility of the ester compound A is lowered first, and accordingly the effect of enhancing the image loadability is enhanced.

It is more preferable for the molecular weight of the ester compound B to be 500 or more and 900 or less, and is more preferable to be 550 or more and 850 or less.

From the above, it is more preferable to use ethylene glycol distearate as the ester compound B.

It is preferable for the content of the ester compound B to be 1.0 part by mass or more and 40.0 parts by mass or less, is more preferable to be 3.0 parts by mass or more and 30.0 parts by mass or less, and is further preferable to be 5.0 parts by mass or more and 25.0 parts by mass or less, with respect to 100.0 parts by mass of the binder resin contained in the toner particle.

Subsequently, among the materials that can be used for the toner particle, internal additives other than the materials described above will be described in detail.

<Release Agent>

The toner particle may contain a known wax as a release agent, in addition to the styrene-acrylic resin having the unit represented by the formula (1), the ester compound A and the ester compound B.

Examples of the release agent include: petroleum waxes represented by paraffin wax, microcrystalline wax and petrolatum and derivatives thereof; montan wax and derivatives thereof; hydrocarbon wax by Fischer-Tropsch method and derivatives thereof; polyolefin waxes represented by polyethylene and derivatives thereof; and natural waxes represented by carnauba wax and candelilla wax, and derivatives thereof, where the derivatives include oxides, block copolymers with vinyl monomers, and graft-modified products as well. These release agents can be used alone or in combination.

<Coloring Agent>

The toner particle may contain a coloring agent. As the coloring agent, conventionally known pigments and dyes of black, yellow, magenta and cyan colors and other colors, magnetic materials and the like can be used without particular limitation.

Examples of the black coloring agent include black pigments such as carbon black.

Examples of the yellow coloring agent include yellow pigments and yellow dyes such as monoazo compounds; disazo compounds; condensed azo compounds; isoindolinone compounds; benzimidazolone compounds; anthraquinone compounds; azo metal complexes; methine compounds; and allylamide compounds.

Specific examples thereof include: C. I. Pigment Yellow 74, 93, 95, 109, 111, 128, 155, 174, 180 and 185; and C. I. Solvent Yellow 162.

Examples of the magenta coloring agent include magenta pigments and magenta dyes such as monoazo compounds; condensed azo compounds; diketopyrrolopyrrole compounds; anthraquinone compounds; quinacridone compounds; basic dye lake compounds; naphthol compounds; benzimidazolone compounds; thioindigo compounds; and perylene compounds.

Specific examples thereof include: C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254 and 269; and C. I. Pigment Violet 19.

Examples of the cyan coloring agent include cyan pigments and cyan dyes such as copper phthalocyanine compounds and derivatives thereof; anthraquinone compounds; and basic dye lake compounds.

Specific examples thereof include C. I. Pigment Blue 1, 7, 15, 15:1, 15:2, 15:3, 15:4, 60, 62 and 66.

It is preferable that the content of the coloring agent is 1.0 part by mass or more and 20.0 parts by mass or less, with respect to 100.0 parts by mass of the binder resin contained in the toner particle or the polymerizable monomer for obtaining the binder resin.

In addition, the toner can be formed into a magnetic toner by containing a magnetic material.

In this case, the magnetic material can also serve as a coloring agent.

Examples of the magnetic material include: iron oxides represented by magnetite, hematite and ferrite; metals represented by iron, cobalt and nickel; alloys of the metals with metals such as aluminum, cobalt, copper, lead, magnesium, tin, zinc, antimony, beryllium, bismuth, cadmium, calcium, manganese, selenium, titanium, tungsten and vanadium; and mixtures thereof.

When the magnetic material is used as the coloring agent, it is preferable that the content of the magnetic material is 30.0 parts by mass or more and 100.0 parts by mass or less, with respect to 100.0 parts by mass of the binder resin contained in the toner particle.

<Charge Control Agent>

The toner particle may contain a charge control agent. As the charge control agent, known charge control agents can be used without any particular limitation.

Examples of a negative charge control agent include: metal compounds of aromatic carboxylic acids such as salicylic acid, alkylsalicylic acid, dialkylsalicylic acid, naphthoic acid and dicarboxylic acid, or polymers or copolymers having the metal compounds of the aromatic carboxylic acids; polymers or copolymers having a sulfonic acid group, a sulfonate group or a sulfonic acid ester group; metal salts or metal complexes of azo dyes or azo pigments; and boron compounds, silicon compounds and calixarenes.

On the other hand, examples of a positive charge control agent include: quaternary ammonium salts; high molecular compounds having a quaternary ammonium salt in a side chain; guanidine compounds; nigrosine-based compounds; and imidazole compounds. For information, examples of the usable polymers or copolymers having a sulfonate group or a sulfonic acid ester group include: homopolymers of vinyl-based monomers containing sulfonic acid groups such as styrene sulfonic acid, 2-acrylamido-2-methylpropane sulfonic acid, 2-methacrylamido-2-methylpropane sulfonic acid, vinyl sulfonic acid, and methacrylic sulfonic acid; or copolymers of a vinyl-based monomer described in the section of the binder resin and a vinyl-based monomer containing a sulfonic acid group.

It is preferable that the content of the charge control agent is 0.01 parts by mass or more and 5.0 parts by mass or less, with respect to 100.0 parts by mass of the binder resin contained in the toner particle.

<External Additive>

The toner of the present disclosure may contain an external additive.

As the external additive, conventionally known external additives can be used without particular limitation.

Examples of the external additive include: original silica particulates such as wet-process silica and dry-process silica, and such surface-treated silica particulates that the original silica particulates are subjected to surface treatment by a treatment agent such as a silane coupling agent, a titanium coupling agent or silicone oil; metal oxide particulates represented by titanium oxide particulates, aluminum oxide particulates, and zinc oxide particulates, or such metal oxide particulates that metal oxides are subjected to hydrophobic treatment; fatty acid metal salts represented by zinc stearate, calcium stearate and the like; metal complexes of aromatic carboxylic acids represented by salicylic acid, alkylsalicylic acid, dialkylsalicylic acid, naphthoic acid, dicarboxylic acid and the like; clay minerals represented by hydrotalcite; and fluorine-based resin particulates represented by vinylidene fluoride particulates and polytetrafluoroethylene particulates.

Among the external additives, clay minerals represented by hydrotalcite are preferably used. The clay minerals have high water retentivity, and accordingly, the existence of the clay minerals on the image surfaces after fixing can suppress deterioration of the image surfaces due to drying, which becomes remarkable particularly in the image of a high printing rate. The effect tends to be particularly easily obtained, when a highly hydrophobic resin such as the styrene-acrylic resin of the present disclosure is used as the binder resin of the toner particle.

In addition, it is preferable to use such silica particulates that the original silica particulates are treated with silicone oil, from the viewpoints of the fluidity and the charge stability.

It is preferable that the content of the external additive in the toner of the present disclosure is 0.1 parts by mass or more and 5.0 parts by mass or less, with respect to 100 parts by mass of the toner particles.

<Average Circularity of Toners>

It is preferable that the average circularity of the toners is 0.940 or higher and is 0.995 or lower. When the average circularity of the toners is in this range, the surface of the image after fixing tends to easily become smooth, and the gloss of the fixed image is further enhanced. It is more preferable that the average circularity of the toners is 0.950 or higher and is 0.995 or lower.

A method for measuring the average circularity of the toners will be described later.

Subsequently, the method for obtaining the toner of the present disclosure will be described in detail below.

<Production of Toner Particle>

The toner particle of the present disclosure can be produced with the use of known units such as a kneading and pulverizing method and a wet production method. From the viewpoint of uniformity of the particle size and shape controllability, the wet production method can be preferably used. Examples of the wet production method further include a suspension polymerization method, a dissolution suspension method, and an emulsion agglomeration method; and the emulsion agglomeration method can be preferably used because a state of dispersed ester compound A can be enhanced.

Specific examples of producing the toner particle of the present disclosure by the emulsion agglomeration method include a production example having the following steps (1) and (2).

(1) The step of preparing a dispersion liquid of resin particulates, which forms binder resin particulates for core particles from the binder resin by polymerization in an aqueous medium, and prepares the dispersion liquid in which the binder resin particulates are dispersed, and (2) the step of forming the toner particle by agglomerating the binder resin particulates in an aqueous medium and forming the toner particle.

The steps (1) and (2) will be described in detail below.

(1) Step of Preparing Dispersion Liquid of Resin Particulates

In the step of preparing the dispersion liquid of the resin particulates, binder resin particulates are formed and the binder resin particulates are subjected to the step of forming the toner particle.

Specifically, the binder resin particulate is formed by the following steps of: adding a monomer solution in which a polymerizable monomer for forming the binder resin, the ester compound A, and, if necessary, internal additives such as the ester compound B, the release agent and the charge control agent are dissolved or dispersed, to an aqueous medium containing a surface active agent; applying mechanical energy thereto and forming a droplet of the monomer solution; and subsequently, adding a water-soluble radical polymerization initiator thereto and allowing a polymerization reaction to proceed in the droplet of the monomer solution. For information, an oil-soluble polymerization initiator may be contained in the droplet of the monomer solution. During the polymerization of the binder resin, treatment for forcible emulsification by application of mechanical energy may be conducted. Examples of the units for applying the mechanical energy include units of applying strong stirring or ultrasonic vibration energy such as a homomixer and ultrasonic waves. When polyester resin particulate is used as the binder resin particulate, it is acceptable to synthesize a polyester resin by an ordinary polycondensation reaction and form the particulate from the synthesized polyester resin. Examples of the method for preparing the dispersion liquid of the resin particulates of the polyester resin include: a method of pulverizing the polyester resin by a mechanical method and dispersing the pulverized polyester resin in an aqueous medium with the use of a surface active agent; and a phase inversion emulsification method, and any method may be used.

As the polymerizable monomer in the case where the dispersion liquid of the resin particulates is obtained by the emulsion polymerization method, the polymerizable monomers shown in the section of the above polymerizable monomer can be used. As the polymerization initiator, known polymerization initiators can be used. The details will be described later.

When the surface active agent is used in the step of preparing the dispersion liquid of the resin particulates, known surface active agents can be used. The details will be described later.

The toner particle may contain an internal additive such as the ester compound B, the coloring agent, the release agent and the charge control agent, if necessary, in addition to the binder resin and the ester compound A. Such an internal additive can be introduced into the toner particle by, for example, dissolving or dispersing the internal additive in a monomer solution for forming the binder resin in advance, in the step of preparing the dispersion liquid of the resin particulates.

In addition, such an internal additive can also be introduced into the toner particle by separately preparing a dispersion liquid of internal additive particulates formed only of an internal additive, and agglomerating the internal additive particulates together with the resin particulates and the coloring agent particulates, in the step of forming the toner particle.

As the internal additive, the above materials can be used.

(2) Step of Forming Toner Particle

In this step of forming the toner particle, if necessary, particulates of other toner components such as the ester compound B, the coloring agent, the release agent and the charge control agent can be agglomerated together with the binder resin particulates and the particulates of the ester compound A.

Specific examples of a method of agglomerating and fusion bonding the binder resin particulates, the particulates of the ester compound A and the other internal additive particulates include the following methods. An agglomerating agent is added to an aqueous medium so that the concentration becomes a critical agglomeration concentration or higher, and then is heated to a temperature not lower than the glass transition point of the binder resin particulate and the particulate of the ester compound A, and not higher than a melting peak temperature of the mixture thereof. Thereby, the salting-out of the binder resin particulate, the particulate of the ester compound A and the particulates of other toner components such as the coloring agent particulate is progressed, and at the same time, the fusion bonding is progressed in parallel. When the toner particle has grown to a desired particle size, an agglomeration stopping agent is added to stop the growth of the particle. Furthermore, if necessary, the heating is continuously conducted so that the particle shape is controlled.

In the step of forming the toner particle, it is preferable to shorten a time period for which the mixture after the addition of the agglomerating agent is left to stand, as short as possible, and to rapidly heat the mixture to a temperature not lower than the glass-transition points of the binder resin particulate and the particulate of the ester compound A and not higher than a melting peak temperature of the mixture. The reason for this is not clear, but it is considered that the state of the agglomerated particle varies depending on the left time after the salting-out, and that there occurs a problem that the particle size distribution becomes unstable, or the surface properties of the fusion bonded particle vary. It is preferable for a time period to be spent until the temperature is raised to the temperature to be within 30 minutes usually, and is more preferable to be within 10 minutes. In addition, it is preferable that the temperature raising rate is 1° C./min or larger. The upper limit of the temperature raising rate is not particularly limited, but is preferably 15° C./min or smaller from the viewpoint of suppressing occurrence of a coarse particle due to a rapid progress of the fusion bonding. Furthermore, after the reaction system has reached a temperature of the glass transition point or higher, it is essential to hold the temperature of the reaction system for a certain period of time, and thereby to continue the fusion bonding. Thereby, the growth and fusion bonding of the core particles can be effectively progressed, and the durability of the finally obtained toner particle can be enhanced.

As the agglomerating agent, known metal salts having a divalent or higher valent metal ion can be used. The details will be described later.

When the surface active agent is used in the step of forming the toner particle, known surface active agents can be used. The details will be described later.

<Polymerization Initiator>

As the polymerization initiator to be used when the emulsion polymerization method is employed in the step of preparing the dispersion liquid of the resin particulates, known polymerization initiators can be used without particular limitation.

Examples of the polymerization initiator include: peroxide-based polymerization initiators represented by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, triphenyl peracetic acid-tert-hydroperoxide, tert-butyl performate, tert-butyl peracetate, tert-butyl perbenzoate, tert-butyl perphenylacetate, tert-butyl permethoxyacetate, N-(3-toluyl)perpalmitate-tert-butylbenzoyl peroxide, t-butylperoxy-2-ethyl hexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide and lauroyl peroxide; and azo or diazo polymerization initiators represented by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

<Surface Active Agent>

As the surface active agent to be used in the step for forming the toner particle, known anionic surface active agents, cationic surface active agents and nonionic surface active agents can be used.

Examples of the anionic surface active agent include: alkyl sulfates such as sodium lauryl sulfate; polyoxyethylene alkyl ether sulfates such as sodium polyoxyethylene lauryl ether sulfate; sulfonates such as sodium dodecylbenzene sulfonate and sodium alkyl naphthalene sulfonate; and higher fatty acid salts such as sodium stearate and sodium laurate.

Examples of the cationic surface active agent include: quaternary ammonium salts such as dodecylammonium bromide, dodecyltrimethylammonium bromide, dodecylpyridinium chloride, dodecylpyridinium bromide, hexadecyltrimethylammonium bromide, lauryltrimethylammonium chloride and alkylbenzyldimethylammonium chloride.

Examples of the nonionic surface active agent include: polyoxyethylene alkyl ethers such as polyoxyethylene lauryl ether and polyoxyethylene oleyl ether; polyoxyalkylene derivatives such as polyoxyethylene alkylene alkyl ether; sorbitan fatty acid esters such as sorbitan monolaurate and sorbitan monostearate; glycerin fatty acid esters such as glycerol monostearate; polyoxyethylene fatty acid esters such as polyethylene glycol monolaurate.

Subsequently, examples of measurement methods to be used in the present specification will be described in detail below.

<Method for Calculating Solubility Parameter Value (SP Value)>

The SPw1 which is the SP value of the ester compound A of the present disclosure, and the SPw2 which is the SP value of the ester compound B were determined in the following way, according to the calculation method proposed by Fedors.

For example, when the SP value (SPw1) $(J/cm^3)^{1/2}$ of the ester compound A is calculated, the evaporation energies (Δei) (J/mol) and the molar volumes (Δvi) ($cm^3$/mol) of the atoms or atomic groups in the molecular structure of the ester compound are determined from the table described in "Polym. Eng. Sci., 14(2), 147-154 (1974)", and the SP value is calculated by the following Expression (8).

$$SPw1 = (\Sigma\Delta ei/\Sigma\Delta vi)^{1/2} \quad \text{Expression (8)}$$

The SPb which is the SP value of the styrene-acrylic resin of the present disclosure was determined in the following way according to the calculation method proposed by Fedors.

First, the SP value of the repeating unit which constitutes the styrene-acrylic resin is determined in the following way. Here, the repeating unit which constitutes the styrene-acrylic resin means a molecular structure in a state in which a double bond of the styrene-acrylic monomer to be used when the styrene-acrylic resin is obtained by polymerization is cleaved by polymerization.

For example, when the SP value($\sigma_m$) $(J/cm^3)^{1/2}$ of the repeating unit is calculated, the evaporation energies (Δei) (J/mol) and the molar volumes (Δvi) ($cm^3$/mol) of the atoms or atomic groups in the molecular structure of the repeating unit are determined from the table described in "Polym. Eng. Sci., 14(2), 147-154 (1974)", and the SP value is calculated by the following Expression (9).

$$\sigma_m = (\Sigma\Delta ei/\Sigma\Delta vi)^{1/2} \quad \text{Expression (9)}$$

In order to determine the SP value (SPb) of the styrene-acrylic resin, the evaporation energies (Δei) and the molar volumes (Δvi) of the repeating units which constitute the resin are determined for each of the repeating units. Then, the products of each of the evaporation energies (Δei) and the molar volumes (Δvi) with the molar ratio (j) in the resin of each repeating unit are calculated, and the quotients are determined by dividing the total sum of the evaporation energies of each repeating unit by the total sum of the molar volumes, and the SP value is calculated according to the following Expression (10).

$$\sigma_p = \{(\Sigma j \times \Sigma\Delta ei)/(\Sigma j \times \Sigma\Delta vi)\}^{1/2} \quad \text{Expression (10)}$$

For example, when it is assumed that the resin is formed of two types of repeating units of X and Y, and when the composition ratios of repeating units are represented by Wx and Wy (mass %), the molecular weights are represented by Mx and My, the evaporation energies are represented by Δei(X) and Δei(Y), and the molar volumes are represented by Δvi(X) and Δvi(Y), respectively, the molar ratios (j) of the respective repeating units become respectively Wx/Mx and Wy/My, and the solubility parameter value ($\sigma_p$) of the resin is expressed by the following Expression (11).

$$\sigma_p = [\{(Wx/Mx) \times \Delta ei(X) + Wy/My \times \Delta ei(Y)\}/\{(Wx/Mx) \times \Delta vi(X) + Wy/My \times \Delta vi(Y)\}]^{1/2} \quad \text{Expression (11)}$$

Furthermore, when two or more types of resins are mixed, the SP value ($\sigma_M$) of the mixture is determined, by calculating the products of the mass composition ratios (Wi) of the mixture and the SP values (σi) of respective resins, and totalizing the products according to the following Expression (12).

$$\sigma_M = \Sigma(Wi \times \sigma i) \quad \text{Expression (12)}$$

<Method for Separating Binder Resin and Ester Compound from Toner>

The toner is dissolved in tetrahydrofuran (THF); from the obtained soluble components, a solvent is distilled off under reduced pressure; and components of the toner are obtained, which are soluble in the tetrahydrofuran (THF). The components of the obtained toner, which are soluble in the tetrahydrofuran (THF), are dissolved in chloroform, and a sample solution is prepared of which the concentration is 25 mg/ml. The obtained sample solution in an amount of 3.5 ml is injected into the following apparatus, and the components are separately collected under the following conditions, which are a low-molecular-weight component derived from the release agent having a molecular weight of less than 2000, and a high-molecular-weight component derived from the binder resin having a molecular weight of 2000 or more.

Preparative GPC apparatus: Preparative HPLC (trade name: LC-980, manufactured by Japan Analytical Industry Co., Ltd.)

Preparative column: JAIGEL 3H and JAIGEL 5H (manufactured by Japan Analytical Industry Co., Ltd.)

Eluent: chloroform

Flow rate: 3. 5 mL/min

After separative collection, the solvent is distilled off under reduced pressure, and the residue is further dried in an atmosphere at 90° C. under reduced pressure for 24 hours.

<Measurement of Molecular Weight of Ester Compound by Mass Spectrometry>

Separation of Ester Compound from Toner

The molecular weight of the ester compound in the toner can be determined by measuring the toner, but is more preferably measured after the separating operation.

The toner is dispersed in ethanol which is a poor solvent for the toner, and the temperature is raised to a temperature exceeding a melting point of the ester compound. At this time, pressure may be applied, if necessary. By this operation, the ester compound that exceeds the melting point is melted and extracted in ethanol. When the pressure is applied in addition to heating, the ester compound can be separated from the toner by the solid-liquid separation in a state in which the pressure is applied.

Then, the extract is dried and solidified, and thereby the ester compound is obtained.

The obtained ester compound is subjected to pyrolysis GCMS, for example, by the following apparatus and under the following measurement conditions; and the ester compound can be identified and the molecular weight can be measured.

Mass spectrometry apparatus: ISQ manufactured by Thermo Fisher Scientific K.K.

GC apparatus: Focus GC manufactured by Thermo Fisher Scientific K.K.

Ion source temperature: 250° C.

Ionization method: EI

Mass range: 50 to 1000 m/z

Column: HP-5MS [30 m]

Pyrolytic apparatus: JPS 700 manufactured by Japan Analytical Industry Co., Ltd.

A small amount of the ester compound separated by the extraction operation and 1 μL of tetramethylammonium hydroxide (TMAH) are added to pyrofoil at 590° C. The produced sample is subjected to pyrolysis GCMS measurement under the above conditions, and peaks are each obtained for an alcohol component and a carboxylic acid component derived from the ester compound. At this time, by the action of TMAH which is a methylating agent, the alcohol component and the carboxylic acid component are detected as methylated products. The molecular weight of the ester compound can be determined by analyzing the obtained peaks and identifying the structure of the ester compound.

In addition, when the ester compound is identified and the molecular weight thereof is measured by a direct introduction method, the identification and the molecular weight measurement can be performed, for example, by the following apparatus and under following measurement conditions.

Mass spectrometry apparatus: ISQ manufactured by Thermo Fisher Scientific K.K.

Ion source temperature: 250° C. Electronic energy: 70 eV

Mass range: 50 to 1000 m/z (CI).

Reagent Gas: methane (CI)

Ionization method: Direct Exposure Probe (DEP) manufactured by Thermo Fisher Scientific K.K., 0 mA (10 sec) to 10 mA/sec to 1000 mA (10 sec)

The ester compound separated by the extraction operation is directly placed on the filament part of the DEP unit and is subjected to measurement. A molecular ion of a mass spectrum of a main component peak in the vicinity of 0.5 minutes to 1 minute of the obtained chromatogram is checked; and an ester compound is identified, and a molecular weight is determined.

<Method for Measuring Content of Ester Compound in Toner>

The content of the ester compound in the toner can be measured with the use of a thermal analysis apparatus (trade name: DSC Q2000, manufactured by TA Instruments Japan Co., Ltd.).

Approximately 5.0 mg of the toner sample is charged into a sample container of a pan made from aluminum (KITNO. 0219-0041), the sample container is placed on a holder unit, and the holder unit is set in an electric furnace. The sample is heated from 30° C. to 200° C. at a temperature raising rate of 10° C./min in a nitrogen atmosphere, a DSC curve is measured by a differential scanning calorimeter (DSC), and an endothermic amount of the ester compound in the toner sample is calculated. In addition, with the use of approximately 5.0 mg of a sample of a simple ester compound, the endothermic amount is calculated in a similar method. Then, with the use of the endothermic amount of the ester compound obtained in each measurement, the content of the wax is determined by the following Expression.

Content (% by mass) of ester compound in toner=(endothermic amount (J/g) of ester compound in toner sample)/(endothermic amount (J/g) of simple ester compound)×100

<Composition Analysis of Binder Resin>

Method for Separating Binder Resin from Toner

The toner in an amount of 100 mg is dissolved in 3 mL of chloroform. Subsequently, the liquid is subjected to suction filtration with a syringe equipped with a sample treatment filter (pore size of 0.2 μm or larger and 0.5 μm or smaller, with the use of, for example, Myshori Disk H-25-2 (manufactured by Tosoh Corporation) or the like), and thereby the insoluble matter is removed.

The chloroform-soluble component obtained in the above is introduced into preparative HPLC (apparatus: LC-9130 NEXT manufactured by Japan Analytical Industry Co., Ltd., with preparative columns (60 cm) in which two columns having exclusion limits of 20000 and 70000 are connected), and chloroform is sent thereinto as an eluent. When a peak can be checked in the display of the obtained chromatograph, a fraction is separately collected of which the retention time corresponds to a molecular weight of 2000 or more in a monodisperse polystyrene standard sample. The solution of the obtained fraction is dried and solidified, and the binder resin is obtained.

Measurement of Composition Ratio and Weight Ratio by Nuclear Magnetic Resonance Spectroscopy (NMR)

Into 20 mg of the toner, 1 mL of heavy chloroform is added, and the NMR spectrum of a proton of the dissolved binder resin is measured. From the obtained NMR spectrum, the molar ratio and weight ratio of each monomer are calculated, and the content ratio of the unit derived from styrene can be determined. For example, in the case of a styrene-acrylic copolymer, the composition ratio and the weight ratio can be calculated, based on a peak around 6.5 ppm derived from a styrene monomer and a peak around 3.5 to 4.0 ppm derived from an acrylic monomer.

For nuclear magnetic resonance spectroscopy (NMR), the following apparatus and measurement conditions can be used.

NMR apparatus: RESONANCE ECX500 manufactured by JEOL Ltd.

Observation nucleus: proton

Measurement mode: single pulse

<Method for Measuring Glass Transition Temperature (Tg) of Styrene-Acrylic Resin>

The glass transition temperature (Tg) of the binder resin is measured according to ASTM D3418-82 with the use of a differential scanning calorimeter (trade name: Q1000, manufactured by TA Instruments Com.). The melting points of indium and zinc are used for the temperature correction of a detecting section of the apparatus, and the heat of fusion of indium is used for the correction of the amount of heat. Specifically, 5 mg of the styrene-acrylic resin is precisely weighed and charged into a pan made from aluminum, and measurement is performed with the use of an empty pan made from aluminum as a reference, in a measurement range of 30 to 200° C., at a temperature raising rate of 1° C./min. In this temperature rising process, a change in specific heat is obtained in temperature range of 40° C. to 100° C. The glass transition temperature (Tg) of the styrene-acrylic resin is defined as the intersection of a differential thermal curve and a line at the midpoint between the baselines before and after the appearance of the change in the specific heat, at the time.

<Method for Measuring Average Circularities of Toners and Toner Particles>

The average circularities of the toners and the toner particles are measured and analyzed by a flow-type particle-image analyzer (trade name: FPIA-3000, manufactured by Sysmex Corporation), under the following conditions.

The specific measurement method is as follows. First, 20 ml of ion-exchanged water from which impure solids and the like have been removed in advance is charged into a vessel made from glass. Into the ion-exchanged water, 0.2 ml of the diluted solution is added as a dispersing agent (trade name: Contaminon N, manufactured by Wako Pure Chemical Industries, Ltd.: and aqueous solution that has pH of 7 and contains 10% by mass of the neutral detergent for cleaning precision measuring instruments, which is formed of nonionic surface active agent, anionic surface active agent, and organic builder), in a form of being diluted with ion-exchanged water to 3 times by mass. Further, 0.02 g of a measurement sample is added thereinto, and the resultant liquid is subjected to dispersion treatment using an ultrasonic dispersion device for 2 minutes, and a dispersion liquid for measurement is obtained. At this time, the dispersion liquid is appropriately cooled so that the temperature thereof becomes 10° C. or higher and 40° C. or lower. As the ultrasonic dispersion device, a desktop type of ultrasonic cleaner dispersion device (for example, "VS-150" (manufactured by Velvo-Clear Co., Ltd.)) is used of which the oscillation frequency is 50 kHz and the electric output is 150 W; and a predetermined amount of ion-exchanged water is charged into a water tank, and approximately 2 ml of the Contaminon N is added into the water tank.

For the measurement, a flow-type particle-image analyzer was used which was equipped with "UPlanApro" (of which magnification is 10 times and numerical aperture is 0.40) as an objective lens, and a particle sheath (trade name: PSE-900A, manufactured by Sysmex Corporation) was used as a sheath liquid. The dispersion liquid which is prepared according to the procedure is introduced into the flow-type particle-image analyzer, and 3000 toner particles are measured in a total count mode, in an HPF measurement mode. Then, a binarization threshold value at the time of particle analysis is set to 85%, the analysis particle size is limited to a circle equivalent diameter of 1.985 μm or larger and smaller than 39.69 μm, and the average circularities of the toners and the toner particles are obtained.

In the measurement, the focus is automatically adjusted with the use of a standard latex particle (for example "RESEARCH AND TEST PARTICLES Latex Microsphere Suspensions 5200A" manufactured by Duke Scientific Corporation is diluted with ion-exchanged water), before starting measurement.

<Method for Measuring Weight Average Particle Size (D4)>

The weight average particle size (D4) of the toner particles is calculated in the following way.

As a measuring apparatus, a precision particle size distribution measuring apparatus (trade name: Coulter Counter Multisizer 3 (registered trademark), manufactured by Beckman Coulter, Inc.) is used, which is based on a pore electric resistance method and is equipped with an aperture tube of 100 μm.

For setting the measurement conditions and analyzing the measurement data, a dedicated software (trade name: Beckman-Coulter Multisizer 3 Version 3. 51, manufactured by Beckman Coulter Inc.) is used which is attached thereto. For information, the measurement is performed through 25000 channels which are the number of effective measurement channels.

As an electrolytic aqueous solution to be used for the measurement, a solution, for example, "ISOTON II" (manufactured by Beckman Coulter, Inc.) can be used, which is prepared by dissolving guaranteed grade sodium chloride in ion-exchanged water so as to have a concentration of 1.0% by mass.

For information, the dedicated software is set in the following way, before the measurement and analysis are performed.

In a screen of "changing standard operation measurement method (SOMME)" in the dedicated software, the total count number in the control mode is set to 50,000 particles, the number of measurements is set to 1, and the Kd value is set to a value obtained with the use of "Standard particle 10.0 μm" (manufactured by Beckman Coulter, Inc.). The threshold and the noise level are automatically set by pressing "measurement button of threshold/noise level". In addition, the current is set to 1600 μA, the gain is set to 2, the electrolytic solution is set to ISOTON II, and "flush of aperture tube after measurement" is checked.

In the screen of "setting conversion from pulse to particle size" of the dedicated software, a bin interval is set to a logarithmic particle size, a particle size bin is set to 256 particle size bin, and a particle size range is set to a value from 2 μm to 60 μm.

A specific measurement method is as follows.

(1) Into a 250 ml round-bottomed beaker made from glass, which is dedicated to Multisizer 3, 200.0 mL of the electrolytic aqueous solution is charged, the beaker is set on a sample stand, and a stirrer rod is rotated counterclockwise at 24 rotation/second to stir the solution. Then, dirt and air bubbles in the aperture tube are removed, by an "aperture tube flush" function of the dedicated software.

(2) The electrolytic aqueous solution in an amount of 30.0 mL is charged into a 100 mL flat-bottomed beaker made from glass. Into the aqueous solution, 0.3 mL of a diluted solution is added that is obtained by diluting "Contaminon N" (10% aqueous solution of a neutral detergent for cleaning precision measuring devices, which is formed of a nonionic surface active agent, an anionic surface active agent and an organic builder, and has a pH of 7; and manufactured by Wako Pure Chemical Industries, Ltd.) as a dispersing agent, with ion-exchanged water to 3 times by mass.

(3) An ultrasonic dispersion device "Ultrasonic Dispersion System Tetra 150" (manufactured by Nikkaki Bios Co., Ltd.) is prepared, which houses two oscillators having an oscillation frequency of 50 kHz in a state in which the phases are shifted by 180 degrees, and has an electrical output of 120 W. Into a water tank of the ultrasonic dispersion device, 3.3 L of ion-exchanged water is charged, and into the water tank, 2.0 mL of the Contaminon N is added.

(4) The beaker of the above (2) is set in a beaker fixing hole of the above ultrasonic dispersion device, and the ultrasonic dispersion device is operated. Then, a height position of the beaker is adjusted so that a resonance state of the liquid surface of the electrolytic aqueous solution in the beaker becomes maximum.

(5) In a state in which the electrolytic aqueous solution in the beaker of the above (4) is irradiated with ultrasonic waves, 10 mg of the toner particle is added little by little into the above electrolytic aqueous solution, and is dispersed therein. Then, the ultrasonic dispersion treatment is continued further for 60 seconds. For information, in the ultrasonic dispersion, a water temperature in the water tank is appropriately adjusted to 10° C. or higher and 40° C. or lower.

(6) The electrolytic aqueous solution of the above (5), in which the toner particles have been dispersed, is added dropwise into the round-bottomed beaker of the above (1) with the use of a pipet, which has been placed in the sample stand, and the measurement concentration is adjusted so as to become 5%. Then, the measurement is performed until the number of particles to be measured reaches 50,000.

(7) The measurement data is analyzed by the dedicated software attached to the apparatus, and the weight average particle size (D4) is calculated. For information, the "average size" on a screen of "analysis/volume statistical value (arithmetic average)" at the time when graph/volume % has been set in the dedicated software is the weight average particle size (D4).

EXAMPLES

In the following Examples, the number of parts is based on parts by mass.

<Example of Step for Preparing Dispersion Liquid of Resin Particulates>

<Preparation of Dispersion Liquid 1 of Resin Particulates>

Styrene 81.0 parts n-butyl acrylate 13.0 parts

Lauryl acrylate 6.0 parts n-Lauryl mercaptan 3.2 parts

The above materials were mixed and mutually dissolved. Into this solution, an aqueous solution was added and dispersed in which 1.5 parts of NEOGEN RK (manufactured by DKS Co., Ltd.) was dissolved in 150 parts of ion-exchanged water. Furthermore, an aqueous solution in which 0.3 parts of potassium persulfate was dissolved in 10 parts of ion-exchanged water was added thereto, while the mixed liquid was slowly stirred for 10 minutes. After purging the inside of the system with nitrogen, emulsion polymerization was conducted at 70° C. for 6 hours. After the completion of the polymerization, the reaction solution was cooled to room temperature, and ion-exchanged water was added thereto; and a dispersion liquid 1 of the resin particulates was obtained, in which the solid content concentration was 20.0% by mass and a volume-based median size of the particulates was 0.2 μm. The SPb which was the SP value of the obtained styrene-acrylic resin was 20.00 $(J/cm^3)^{1/2}$, and the glass transition temperature Tg was 56° C.

<Preparation of Dispersion Liquids 2 to 11 of Resin Particulates>

Dispersion liquids 2 to 11 of the resin particulates were obtained in the same manner as in the production example of the dispersion liquid 1 of the resin particulates, except that the materials to be used were changed as shown in the following Table 1.

TABLE 1

| | St | n-BA | LA | n-OA | n-DA | MA | PA | Volume average median size (μm) | SP value $(J/cm^3)^{1/2}$ | Tg (° C.) |
|---|---|---|---|---|---|---|---|---|---|---|
| Dispersion liquid of resin particulates 1 | 81.0 | 13.0 | 6.0 | 0.0 | 0.0 | 0.0 | 0.0 | 0.2 | 20.00 | 56 |
| Dispersion liquid of resin particulates 2 | 80.0 | 0.0 | 20.0 | 0.0 | 0.0 | 0.0 | 0.0 | 0.2 | 19.83 | 52 |
| Dispersion liquid of resin particulates 3 | 85.0 | 0.0 | 15.0 | 0.0 | 0.0 | 0.0 | 0.0 | 0.2 | 19.90 | 56 |
| Dispersion liquid of resin particulates 4 | 82.0 | 9.0 | 9.0 | 0.0 | 0.0 | 0.0 | 0.0 | 0.2 | 19.97 | 56 |
| Dispersion liquid of resin particulates 5 | 80.0 | 17.0 | 3.0 | 0.0 | 0.0 | 0.0 | 0.0 | 0.2 | 20.04 | 56 |
| Dispersion liquid of resin particulates 6 | 78.5 | 20.5 | 1.0 | 0.0 | 0.0 | 0.0 | 0.0 | 0.2 | 20.07 | 56 |
| Dispersion liquid of resin particulates 7 | 81.0 | 13.0 | 0.0 | 6.0 | 0.0 | 0.0 | 0.0 | 0.2 | 20.03 | 56 |
| Dispersion liquid of resin particulates 8 | 81.0 | 13.0 | 0.0 | 0.0 | 6.0 | 0.0 | 0.0 | 0.2 | 20.02 | 56 |
| Dispersion liquid of resin particulates 9 | 78.0 | 22.0 | 0.0 | 0.0 | 0.0 | 0.0 | 0.0 | 0.2 | 20.08 | 56 |
| Dispersion liquid of resin particulates 10 | 81.0 | 13.0 | 0.0 | 0.0 | 0.0 | 6.0 | 0.0 | 0.2 | 19.99 | 56 |
| Dispersion liquid of resin particulates 11 | 81.0 | 13.0 | 0.0 | 0.0 | 0.0 | 0.0 | 6.0 | 0.2 | 19.99 | 56 |

In Table 1, St represents styrene, n-BA represents n-butyl acrylate, LA represents lauryl acrylate, n-OA represents n-octyl acrylate, n-DA represents n-decyl acrylate, MA represents myristyl acrylate, and PA represents palmityl acrylate; and the numerical values of these chemical compounds represent the number of parts.

<Example of Step for Preparing Dispersion Liquid of Ester Compound A>

<Preparation of Dispersion Liquid 1 of Ester Compound A>

Pentaerythritol tetrabehenate 100.0 parts

NEOGEN RK 15.0 parts

Ion-exchanged water 385.0 parts

The above materials were mixed and dispersed for approximately 1 hour with the use of a wet jet mill (trade name: JN100, manufactured by Jokoh Co., Ltd.), and a dispersion liquid 1 of the ester compound A was obtained. The concentration of the dispersion liquid 1 of the ester compound A was 20% by mass.

<Preparation of Dispersion Liquids 2 to 6 of Ester Compound A>

Dispersion liquids 2 to 6 of the ester compound A were obtained in the same manner as in the production example of the dispersion liquid 1 of the ester compound A, except that the used materials were changed as shown in the following Table 2. The concentration of any of the dispersion liquids was 20% by mass.

TABLE 2

| | Ester compound A | Abbreviated expression | Structure | Alkyl group carbon number | SP value $(J/cm^3)^{1/2}$ | Melting point (° C.) |
|---|---|---|---|---|---|---|
| Dispersion liquid 1 of ester compound A | Pentaerythritol tetrabehenate | PE22 | Formula (2') | 22 | 18.15 | 82 |
| Dispersion liquid 2 of ester compound A | Pentaerythritol tetrastearate | PE18 | Formula (2') | 18 | 18.27 | 77 |
| Dispersion liquid 3 of ester compound A | Dipentaerythritol hexabehenate | DP22 | Formula (3') | 22 | 18.21 | 87 |
| Dispersion liquid 4 of ester compound A | Pentaerythritol tetrapalmitate | PE16 | Formula (2) | 16 | 18.40 | 74 |
| Dispersion liquid 5 of ester compound A | Dipentaerythritol hexastearate | DP18 | Formula (3') | 18 | 18.35 | 78 |
| Dispersion liquid 6 of ester compound A | Dipentaerythritol hexapalmitate | DP16 | Formula (3) | 16 | 18.44 | 73 |

<Preparation of Dispersion Liquids 1 to 5 of Ester Compound B>

Dispersion liquids 1 to 5 of the ester compound B were obtained in the same manner as in the production example of the dispersion liquid 1 of the ester compound A, except that the used materials were changed as shown in the following Table 3. The concentration of any of the dispersion liquids was 20% by mass.

TABLE 3

| | Ester compound B | Structure | Alkyl group carbon number | SP value $(J/cm^3)^{1/2}$ | Melting point (° C.) |
|---|---|---|---|---|---|
| Dispersion liquid 1 of ester compound B | Ethylene glycol distearate | Formula (4) | 17 | 18.11 | 76 |
| Dispersion liquid 2 of ester compound B | Ethylene glycol dipalmitate | Formula (4) | 15 | 18.16 | 69 |
| Dispersion liquid 3 of ester compound B | Ethylene glycol dibehenate | Formula (4) | 21 | 18.02 | 83 |
| Dispersion liquid 4 of ester compound B | Dibehenyl sebacate | Formula (5) | 22 | 17.94 | 73 |
| Dispersion liquid 5 of ester compound B | Behenyl behenate | Formula (6) | 22 | 17.56 | 73 |

<Preparation Example of Dispersion Liquid of Paraffin Wax>

A dispersion liquid of paraffin wax was produced in the same manner as in the production example of the dispersion liquid 1 of the ester compound A, except that pentaerythritol tetrastearate was changed to HNP-51 (manufactured by Nippon Seiro Co., Ltd.) in the production example of the dispersion liquid 1 of the ester compound A.

<Preparation Example of Dispersion Liquid of Coloring Agent>

Carbon black (trade name: Nipex35, manufactured by Orion Engineered Carbons S.A.) in an amount of 100.0 parts as a coloring agent, and NEOGEN RK in an amount of 15 parts were mixed with 885.0 parts of ion-exchanged water, the mixture was dispersed with the use of a wet jet mill (trade name: JN100, manufactured by Jokoh Co., Ltd.) for approximately 1 hour, and a dispersion liquid of a coloring agent was obtained.

<Example of Step for Forming Toner Particle>

<Formation Example of Toner Particle 1>

Dispersion liquid 1 of resin particulates 100.0 parts
Dispersion liquid 1 of ester compound A 8.0 parts
Dispersion liquid 1 of ester compound B 12.0 parts
Dispersion liquid of coloring agent 8.0 parts While the above materials were stirred with the use of a homogenizer (trade name: Ultra-Turrax® T50, manufactured by IKA Company), the temperature in the container was adjusted to 30° C., and the pH of the dispersion liquid was adjusted to 8.0 by adding an aqueous solution of 1 mol/L sodium hydroxide. As an agglomerating agent, an aqueous solution in which 0.3 parts of magnesium sulfate was dissolved in 10 parts of ion-exchanged water was added to the dispersion liquid over 10 minutes while stirring at 30° C. After the liquid was left for 3 minutes, the temperature thereof was raised to 60° C., and associated particles were formed. In this state, the particle size of the associated particles was measured with "Coulter Counter Multisizer 3" (manufactured by Beckman Coulter, Inc.). At the time point when the weight average particle size (D4) of the associated particles reached 6.5 μm, 0.9 parts of sodium chloride and 5.0 parts of NEOGEN RK were added to stop the growth of the particles, and thereby a dispersion liquid 1 of the toner particles was obtained.

Hydrochloric acid was added to the obtained dispersion liquid 1 of the toner particles to adjust the pH of the dispersion liquid to 1.5 or lower, the dispersion liquid was left for 1 hour while being stirred, and then was subjected to solid-liquid separation with a pressure filter; and a toner cake was obtained. This toner cake was reslurried with ion-exchanged water to form a dispersion liquid again, and then the dispersion liquid was subjected to the solid-liquid separation with a pressure filter. Reslurrying and solid-liquid separation were repeated until the electric conductivity of the filtrate became 5.0 μS/cm or smaller, and the resultant filtrate was finally subjected to solid-liquid separation; and a toner cake was obtained. The obtained toner cake was dried by an air flow dryer, Flash Jet Dryer (manufactured by Seishin Enterprise Co., Ltd.). The drying conditions were adjusted so that a blowing temperature was 90° C., and a temperature of the drier outlet was 40° C., and the supply rate of the toner cake was adjusted to such a rate that the outlet temperature did not deviate from 40° C., in correspondence with the water content of the toner cake. Furthermore, fine and coarse powders were cut off with the use of a multi-division classifier which uses the Coanda effect, and a toner particle 1 was obtained.

The weight average particle size (D4) and the average circularity of the toner particles 1 were measured by the above methods, and as a result, the weight average particle size (D4) was 6.5 μm and the average circularity was 0.965.

<Formation Examples of Toner Particles 2 to 18 and 20 to 27>

Toner particles 2 to 18 and 20 to 27 were formed in the same manner as in the formation example of the toner particle 1, except that the materials used in the formation example of toner particle 1 were changed to the materials described in Table 4. For information, in the formation example of a toner particle 18, the associated particles were formed at a temperature raised to 75° C.

The weight average particle sizes (D4) and the average circularities of the toner particles 2 to 18 and 20 to 27 were measured by the above methods, and as a result, the weight average particle sizes (D4) of the toner particles 2 to 17 and 20 to 27 were 6.5 μm, and the average circularities thereof were 0.965. In addition, the weight average particle size (D4) of the toner particle 18 was 6.5 μm, and the average circularity thereof was 0.980.

TABLE 4

| | Dispersion liquid of resin particulates | Dispersion liquid of ester compound A (parts) | | Dispersion liquid of ester compound B |
|---|---|---|---|---|
| Toner particle 1 | 1 | 1 | 8.0 | 1 |
| Toner particle 2 | 1 | 2 | 8.0 | 1 |
| Toner particle 3 | 1 | 3 | 8.0 | 1 |
| Toner particle 4 | 1 | 4 | 8.0 | 1 |
| Toner particle 5 | 1 | 2 | 8.0 | 2 |
| Toner particle 6 | 1 | 3 | 8.0 | 3 |
| Toner particle 7 | 1 | 3 | 8.0 | 4 |
| Toner particle 8 | 1 | 5 | 8.0 | 5 |
| Toner particle 9 | 2 | 5 | 8.0 | 5 |
| Toner particle 10 | 3 | 5 | 8.0 | 1 |
| Toner particle 11 | 4 | 2 | 8.0 | 1 |
| Toner particle 12 | 5 | 2 | 8.0 | 1 |
| Toner particle 13 | 6 | 5 | 8.0 | 1 |
| Toner particle 14 | 7 | 6 | 8.0 | 5 |
| Toner particle 15 | 7 | 3 | 8.0 | 5 |
| Toner particle 16 | 8 | 3 | 8.0 | 5 |
| Toner particle 17 | 8 | 6 | 8.0 | 5 |
| Toner particle 18 | 1 | 3 | 8.0 | 1 |

TABLE 4-continued

| | Dispersion liquid of resin particulates | Dispersion liquid of ester compound A (parts) | | Dispersion liquid of ester compound B |
|---|---|---|---|---|
| Toner particle 20 | 1 | 1 | 1.0 | 1 |
| Toner particle 21 | 1 | 1 | 3.0 | 1 |
| Toner particle 22 | 1 | 1 | 12.0 | 1 |
| Toner particle 23 | 1 | 1 | 20.0 | 1 |
| Toner particle 24 | 9 | 5 | 8.0 | 5 |
| Toner particle 25 | 10 | 6 | 8.0 | 5 |
| Toner particle 26 | 11 | 3 | 8.0 | 5 |
| Toner particle 27 | 8 | Dispersion liquid of paraffin wax | 8.0 | 5 |

<Formation Example of Toner Particle 19>

A toner particle 19 was prepared with the use of a pulverization method, in the following way.

Binder resin copolymer of styrene/n-butyl acrylate/lauryl acrylate (mass ratio of styrene:n-butyl acrylate:lauryl acrylate was 81:13:6, and Tg=56° C.): 100.0 parts Carbon black (trade name: Nipex35, manufactured by Orion Engineered Carbons): 8.0 parts Ester compound A (dipentaerythritol hexabehenate, melting point of 87° C.): 8.0 parts Ester compound B (ethylene glycol distearate): 12.0 parts The above materials were premixed with an FM mixer (manufactured by Nippon Coke & Engineering Co., Ltd.), then the mixture was melted and kneaded with a twin-screw kneader (trade name: PCM-30 type, manufactured by Ikegai Corporation), and a kneaded product was obtained. The obtained kneaded product was cooled, was coarsely pulverized with a hammer mill (manufactured by Hosokawa Micron Corporation), and then was pulverized with a mechanical pulverizer (trade name: T-250, manufactured by Turbo Kogyo Co., Ltd.); and a finely pulverized powder was obtained. The obtained finely pulverized powder was classified with the use of a multi-division classifier which used the Coanda effect (trade name: EJ-L-3 type, manufactured by Nittetsu Mining Co., Ltd.), and the toner particle 19 was obtained. The weight average particle size (D4) of the toner particles 19 was 6.5 μm.

The average circularity of the toner particles 19 was measured in the above method, and as a result, the average circularity of the toner particles 19 was 0.940.

<Formation Example of Toner Particle 28>

The toner particle 28 was formed with reference to Example of Japanese Patent Application Laid-Open No. 2014-035506. Details will be described below.

(1) Preparation of Dispersion Liquid of Resin Particulates for Core

First Stage Polymerization

Into a reaction vessel equipped with a stirring apparatus, a temperature sensor, a cooling tube and a nitrogen introduction apparatus, 4 parts of sodium polyoxyethylene(2) dodecyl ether sulfate and 3000 parts of ion-exchanged water were charged, and while the mixture was stirred at a stirring speed of 230 rpm under a nitrogen stream, the internal temperature was raised to 80° C. After the temperature was raised, a dispersion liquid of resin particulates b1 was prepared by operations of: adding a solution to the mixture, in which 10 parts of potassium persulfate was dissolved in 200 parts of ion-exchanged water; controlling the liquid temperature to 75° C.; adding a monomer mixture liquid formed of 68 parts of styrene, 164 parts of n-butyl acrylate and 68 parts of methacrylic acid, dropwise thereto over 1 hour; and then heating and stirring the mixture at 75° C. for 2 hours for polymerization.

(Second Stage Polymerization)

A dispersion liquid containing emulsified particles (oil droplets) was prepared by operations of: charging a solution in which 2 parts of sodium polyoxyethylene(2)dodecyl ether sulfate was dissolved in 3000 parts of ion-exchanged water, into a reaction vessel equipped with a stirring apparatus, a temperature sensor, a cooling tube and a nitrogen introduction apparatus; adding a solution thereto in which 42 parts (in terms of solid content) of the dispersion liquid of the resin particulates b1, which was heated to 80° C., 70 parts of pentaerythrityl tetrabehenate and 70 parts of ethylene glycol distearate were dissolved in a monomer solution formed of 195 parts of styrene, 91 parts of n-butyl acrylate, 20 parts of methacrylic acid, and 3 parts of n-octyl mercaptan, at 80° C.; and mixing and dispersing the mixture with the use of a mechanical dispersing machine (trade name: CLEARMIX, manufactured by M Technique Co., Ltd.) for 1 hour.

Subsequently, a dispersion liquid of resin particulates b2 was prepared by operations of: adding an initiator solution to the dispersion liquid, in which 5 parts of potassium persulfate was dissolved in 100 parts of ion-exchanged water; and heating and stirring the system at 80° C. for 1 hour for polymerization.

(Third Stage Polymerization)

A dispersion liquid of resin particulates C1 for a core was obtained by operations of further adding a solution in which 10 parts of potassium persulfate was dissolved in 200 parts of ion-exchanged water, into the above dispersion liquid of the resin particulates b2; adding a monomer mixture liquid thereto which was formed of 298 parts of styrene, 137 parts of n-butyl acrylate, 50 parts of n-stearyl acrylate, 64 parts of methacrylic acid and 6 parts of n-octyl mercaptan, dropwise under a temperature condition of 80° C. over 1 hour; after completion of the dropwise addition, heating and stirring the mixture for 2 hours to polymerize the components; and then cooling the resultant mixture to 28° C.

(2) Preparation of Dispersion Liquid of Resin Particulates for Shell

Into a reaction vessel equipped with a stirring apparatus, a temperature sensor, a cooling tube and a nitrogen introduction apparatus, a surface active agent solution was charged in which 2.0 parts of sodium polyoxyethylene dodecyl ether sulfate was dissolved in 3000 parts of ion-exchanged water, and while the mixture was stirred at a stirring speed of 230 rpm under a nitrogen stream, the internal temperature was raised to 80° C.

Into this solution, an initiator solution was added in which 10 parts of potassium persulfate was dissolved in 200 parts of ion-exchanged water, and a mixture liquid of a polymerizable monomer was added thereto dropwise over 3 hours, in which chemical compounds were mixed that were 564 parts of styrene, 140 parts of n-butyl acrylate, 96 parts of methacrylic acid and 12 parts of n-octyl mercaptan. After the dropwise addition, the system was heated and stirred at 80° C. for 1 hour to polymerize the components therein, and thereby, a dispersion liquid of the resin particulates S1 for a shell was obtained.

(3) Preparation of Dispersion Liquid of Coloring Agent Particulates

Sodium dodecyl sulfate in an amount of 90 parts was stirred into and dissolved in 1600 parts of ion-exchanged water. While this solution was stirred, 420 parts of carbon black (trade name: Regal 330R, manufactured by Cabot Corporation) was gradually added thereto, then the mixture was subjected to dispersion treatment with the use of a stirring apparatus (trade name: CLEARMIX, manufactured by M Technique Co., Ltd.), and thereby a dispersion liquid Bk of coloring agent particulates was prepared.

A particle size of the coloring agent particulates in the dispersion liquid Bk of the coloring agent particulates was measured with the use of an electrophoretic light scattering photometer (trade name: ELS-800, manufactured by Otsuka Electronics Co., Ltd.), and as a result, was 110 nm.

(4) Formation of Toner Particle (Agglomeration and Fusion Bonding Step)

Into a 5 L reaction vessel equipped with a stirring apparatus, a temperature sensor, a cooling tube and a nitrogen introduction apparatus, 360 parts (in terms of solid content) of a dispersion liquid of the resin particulates C1 for the core, 1100 parts of ion-exchanged water and 200 parts of the dispersion liquid Bk of the coloring agent particulates were charged, the liquid temperature was adjusted to 30° C., then an aqueous solution of 5N sodium hydroxide was added thereto, and the pH was adjusted to 10. Subsequently, an aqueous solution in which 60 parts of magnesium chloride was dissolved in 60 parts of ion-exchanged water was added thereto, at 30° C. over 10 minutes under stirring. After the mixture was held for 3 minutes, the temperature of this system was started to raise to 85° C. over 60 minutes, and the particle growth reaction was continued in a state in which the temperature was held at 85° C. In this state, the particle size of the associated particles was measured with "Coulter Multisizer 3" (manufactured by Beckman Coulter, Inc.), and at the time point when the volume-based median size reached 6 μm, an aqueous solution was added into the system, in which 40 parts of sodium chloride was dissolved in 160 parts of ion-exchanged water, and stopped the particle growth; and furthermore, as an aging step, the mixture was heated and stirred at a liquid temperature of 80° C. for 1 hour, thereby fusion bonding among the particles was progressed, and thereby a core particle 1 was formed.

(Shelling Step)

Next, 40 parts (in terms of solid content) of the dispersion liquid of the resin particulates S1 for the shell was added, stirring was continued at 80° C. for 1 hour, and the resin particulates S1 for the shell were fusion bonded to the surface of the core particle 1 to form a shell layer. Here, an aqueous solution was added thereto in which 150 parts of sodium chloride was dissolved in 600 parts of ion-exchanged water, and the mixture was subjected to aging treatment at 80° C. The average circularity of the toner particles was measured during the aging treatment, and at the time point when the average circularity reached a desired value, the mixture was cooled to 30° C.

(Washing and Drying Step)

The formed particles were subjected to solid-liquid separation with a basket-type centrifugal separator (trade name: MARKIII model number 60×40, manufactured by Matsumoto Kikai Co., Ltd.), and a wet cake of toner particles was formed. The wet cake was washed with ion-exchanged water at 40° C. by a basket-type centrifugal separator until the electric conductivity of the filtrate became 5 μS/cm, and then was dried by a "Flash Jet Dryer" (manufactured by Seishin Enterprise Co., Ltd.) until the water content became 0.5% by mass, and a toner particle 28 was obtained.

The weight average particle size (D4) and the average circularity of the toner particles 28 were measured by the above methods, and as a result, the weight average particle size (D4) was 6.5 μm, and the average circularity was 0.965.

<Formation Example of Toner Particle 29>

The toner particle 29 was formed with reference to Example of Japanese Patent Application Laid-Open No. 2007-322477. Details will be described below.

(1) Production of Binder Resin for Toner

A dispersion liquid was prepared by adding 100 parts of monomer components formed of 84.3 parts of styrene, 14.9 parts of lauryl methacrylate, 0.5 parts of 1,6-hexanediol diacrylate and 0.3 parts of trimethylolpropane trimethacrylate, and 3 parts of benzoyl peroxide as a polymerization initiator, to a liquid in which 0.2 parts of polyvinyl alcohol (PVA235 manufactured by Kuraray Co., Ltd.) was added as a dispersing agent to 200 parts of ion-exchanged water. To this dispersion liquid, Fischer-Tropsch wax was added so as to become 9.9 parts with respect to 100 parts of a vinyl copolymer formed by copolymerization of the monomer components; and the mixture was subjected to suspension polymerization under conditions of 125° C. for 4 hours, and then was cooled. For information, before cooling, an aqueous solution of 25% sodium hydroxide was added so as to become 2% of the volume of the dispersion liquid to adjust the pH of the dispersion liquid to 5.5 or higher, and thereby benzoic acid was neutralized which was a remnant of the polymerization initiator. After that, the resin particles were separated by filtration, and a binder resin for the toner was obtained.

(2) Production of Toner Particle

The obtained binder resin for the toner in an amount of 95 parts was mixed with 5 parts of a coloring agent (trade name: Carbon Black MA-100, manufactured by Mitsubishi Chemical Corporation), and 1 part of a charge control agent (trade name: BONTRON S-34, manufactured by Orient Chemical Industries Co., Ltd.), by a small pulverizer, and the mixture was kneaded at 90° C. for 10 minutes by a Labo Plastomill (manufactured by Toyo Seiki Seisaku-sho, Ltd., capacity 100 ml, number of rotations: 70 rotations). After that, the kneaded product was cooled to room temperature, pulverized by a laboratory jet mill (manufactured by Nippon Pneumatic Mfg. Co., Ltd.), and classified by an air classifier (manufactured by Nippon Pneumatic Mfg. Co., Ltd.); and toners were obtained of which the weight average particle size (D4) was 8.0 μm.

The average circularity of the toner particles 29 was measured by the above method, and as a result, the average circularity of the toner particles 29 was 0.940.

<Production Examples of Toner>

<Production of Toner 1>

Toner particle 1 100 parts

Hydrophobic silica 1.5 parts

Hydrotalcite (trade name: DHT-4A: manufactured by Kyowa Chemical Industry Co., Ltd.) 0.3 parts The above materials were mixed, and stirred with the use of an FM mixer (manufactured by Nippon Coke & Engineering Co., Ltd.), at 3000 rpm for 10 minutes. The mixture was passed through a 200-mesh sieve, and a toner 1 was obtained. The obtained toner was analyzed according to <method for separating binder resin and ester compound from toner>, <measurement of molecular weight of ester compound by mass spectrometry>, <method for measuring content of ester compound in toner>, <composition analysis of binder resin> and <method for measuring average circularities of toners and toner particles>. As a result, abundance ratios of the unit represented by the formula (1), the ester compound A and the ester compound B in the toner were the same as abundance ratios of the components which were charged.

The physical properties of the toner 1 are shown in Table 5.

<Production of Toners 2 to 18 and Toners 21 to 24>

Toners 2 to 18 and toners 21 to 24 were obtained in the same manner as in the production example of the toner 1, except that the toner particle 1 was changed to the toner particles 2 to 18 and toner particles 20 to 23, in the production example of the toner 1. The obtained toner was analyzed according to <method for separating binder resin and ester compound from toner>, <measurement of molecular weight of ester compound by mass spectrometry>, <method for measuring content of ester compound in toner>, <composition analysis of binder resin> and <method for measuring average circularities of toners and toner particles>. As a result, abundance ratios of the unit represented by the formula (1), the ester compound A and the ester compound B in the toner were the same as abundance ratios of the components which were charged.

The physical properties of the toners 2 to 18 and toners 21 to 24 are shown in Table 5.

<Production of Toner 19>

Toner particle 2 100 parts

Hydrophobic silica 1.5 parts

The above materials were mixed, and stirred with the use of an FM mixer (manufactured by Nippon Coke & Engineering Co., Ltd.), at 3000 rpm for 10 minutes. The mixture was passed through a 200-mesh sieve, and a toner 19 was obtained. The obtained toner was analyzed according to <method for separating binder resin and ester compound from toner>, <measurement of molecular weight of ester compound by mass spectrometry>, <method for measuring content of ester compound in toner>, <composition analysis of binder resin> and <method for measuring average circularities of toners and toner particles>. As a result, abundance ratios of the unit represented by the formula (1), the ester compound A and the ester compound B in the toner were the same as abundance ratios of the components which were charged.

The physical properties of the toner 19 are shown in Table 5.

<Production of Toner 20 and Toners 25 to 30>

A toner 20 and toners 25 to 30 were obtained in the same manner as in the production example of the toner 19, except that the toner particle 2 was changed to the toner particle 19 and toner particles 24 to 29, in the production example of the toner 19. The obtained toner was analyzed according to <method for separating binder resin and ester compound from toner>, <measurement of molecular weight of ester compound by mass spectrometry>, <method for measuring content of ester compound in toner>, <composition analysis of binder resin> and <method for measuring average circularities of toners and toner particles>. As a result, abundance ratios of the unit represented by the formula (1), the ester compound A and the ester compound B in the toner were the same as abundance ratios of the components which were charged.

The physical properties of the toner 20 and toners 25 to 30 are shown in Table 5.

TABLE 5

| | | Unit of formula (1) | Ester compound of formula (2) or formula (3) | SPb | SPw1 | SPb-SPw1 | Unit ratio of formula (1) | Ester compound of formula (4), (5) or (6) | SPw2 | SPb-SPw2 | Average circularity | Hydro-talcite |
|---|---|---|---|---|---|---|---|---|---|---|---|---|
| Toner 1 | Toner particle 1 | Y | Y | 20.00 | 18.27 | 1.73 | 6% | Y | 18.11 | 1.89 | 0.965 | Y |
| Toner 2 | Toner particle 2 | Y | Y | 20.00 | 18.15 | 1.85 | 6% | Y | 18.11 | 1.89 | 0.965 | Y |
| Toner 3 | Toner particle 3 | Y | Y | 20.00 | 18.21 | 1.79 | 6% | Y | 18.11 | 1.89 | 0.965 | Y |
| Toner 4 | Toner particle 4 | Y | Y | 20.00 | 18.40 | 1.60 | 6% | Y | 18.11 | 1.89 | 0.965 | Y |
| Toner 5 | Toner particle 5 | Y | Y | 20.00 | 18.15 | 1.85 | 6% | Y | 18.16 | 1.84 | 0.965 | Y |
| Toner 6 | Toner particle 6 | Y | Y | 20.00 | 18.21 | 1.79 | 6% | Y | 18.02 | 1.98 | 0.965 | Y |
| Toner 7 | Toner particle 7 | Y | Y | 20.00 | 18.21 | 1.79 | 6% | Y | 17.94 | 2.06 | 0.965 | Y |
| Toner 8 | Toner particle 8 | Y | Y | 20.00 | 18.35 | 1.65 | 6% | Y | 17.56 | 2.44 | 0.965 | Y |
| Toner 9 | Toner particle 9 | Y | Y | 19.83 | 18.35 | 1.48 | 20% | Y | 17.56 | 2.27 | 0.965 | Y |
| Toner 10 | Toner particle 10 | Y | Y | 19.90 | 18.35 | 1.55 | 15% | Y | 18.11 | 1.79 | 0.965 | Y |
| Toner 11 | Toner particle 11 | Y | Y | 19.97 | 18.15 | 1.82 | 9% | Y | 18.11 | 1.86 | 0.965 | Y |
| Toner 12 | Toner particle 12 | Y | Y | 20.04 | 18.15 | 1.89 | 0% | Y | 18.11 | 1.93 | 0.965 | Y |
| Toner 13 | Toner particle 13 | Y | Y | 20.07 | 18.35 | 1.72 | 1% | Y | 18.11 | 1.96 | 0.965 | Y |
| Toner 14 | Toner particle 14 | Y | Y | 20.02 | 18.44 | 1.58 | 6% | Y | 17.56 | 2.46 | 0.965 | Y |
| Toner 15 | Toner particle 15 | Y | Y | 20.02 | 18.21 | 1.81 | 6% | Y | 17.56 | 2.46 | 0.965 | Y |
| Toner 16 | Toner particle 16 | Y | Y | 19.99 | 18.21 | 1.78 | 6% | Y | 17.56 | 2.43 | 0.965 | Y |
| Toner 17 | Toner particle 17 | Y | Y | 19.99 | 18.44 | 1.55 | 6% | Y | 17.56 | 2.43 | 0.965 | Y |
| Toner 18 | Toner particle 18 | Y | Y | 20.00 | 18.21 | 1.79 | 6% | Y | 18.11 | 1.89 | 0.980 | Y |
| Toner 19 | Toner particle 2 | Y | Y | 20.00 | 18.15 | 1.85 | 6% | Y | 18.11 | 1.89 | 0.965 | N |
| Toner 20 | Toner particle 19 | Y | Y | 20.00 | 18.21 | 1.79 | 6% | Y | 18.11 | 1.89 | 0.940 | N |
| Toner 21 | Toner particle 20 | Y | Y | 20.00 | 18.27 | 1.73 | 6% | Y | 18.11 | 1.89 | 0.965 | Y |
| Toner 22 | Toner particle 21 | Y | Y | 20.00 | 18.27 | 1.73 | 6% | Y | 18.11 | 1.89 | 0.965 | Y |
| Toner 23 | Toner particle 22 | Y | Y | 20.00 | 18.27 | 1.73 | 6% | Y | 18.11 | 1.89 | 0.965 | Y |
| Toner 24 | Toner particle 23 | Y | Y | 20.00 | 18.27 | 1.73 | 6% | Y | 18.11 | 1.89 | 0.965 | Y |
| Toner 25 | Toner particle 24 | N | Y | 20.08 | 18.35 | 1.73 | — | Y | 17.56 | 2.52 | 0.965 | N |
| Toner 26 | Toner particle 25 | N | Y | 20.03 | 18.44 | 1.59 | — | Y | 17.56 | 2.47 | 0.965 | N |
| Toner 27 | Toner particle 26 | N | Y | 19.99 | 18.21 | 1.78 | 6% | Y | 17.56 | 2.43 | 0.965 | N |
| Toner 28 | Toner particle 27 | Y | N | 19.99 | — | — | 6% | Y | 17.56 | 2.43 | 0.965 | N |
| Toner 29 | Toner particle 28 | Y | Y | 20.48 | 18.15 | 2.33 | 9% | Y | 18.11 | 2.37 | 0.965 | N |
| Toner 30 | Toner particle 29 | Y | N | 19.86 | — | — | 15% | N | — | — | 0.940 | N |

In Table 5, in the item of the binder resin, "Y" shows that the binder resin contains the unit represented by the formula (1), and "N" shows that the binder resin does not contain the unit represented by the formula (1). In addition, "formula (2)" to "formula (6)" in the items of the ester compound A and the ester compound B show the chemical compounds represented by the formula (2) to the formula (6), respectively; and "Y" shows that the toner particle contains the chemical compounds represented by the formula (2) to the formula (6), and "N" shows that the toner particle does not contain the chemical compounds represented by the formula (2) to the formula (6). The "ratio of formula (1)" shows a ratio of the mass of the unit represented by the formula (1) to the mass of the binder resin. In the item of hydrotalcite, "Y" shows that the toner contains hydrotalcite as an external additive, and "N" shows that the toner does not contain hydrotalcite.

[Examples and Comparative Examples]

Evaluations were conducted with the use of toners 1 to 30, on the combinations shown in Table 6. The evaluation results are shown in Table 6.

An evaluation method and evaluation criteria of the present disclosure will be described below.

As an image forming apparatus, a modified machine was used in which the process speed was set to 300 mm/sec and the temperature control of the fixing device was changed to be variable, in a commercially available laser printer LBP-712Ci (manufactured by Canon Inc.), and a toner cartridge 040H (black) (manufactured by Canon Inc.) was used which was a commercially available process cartridge. The product toner was taken out from the inside of the cartridge, and the inside was cleaned by air blowing, and then was filled with 165 g of the toner of the present disclosure. For information, into yellow, magenta and cyan stations, yellow, magenta and cyan cartridges were inserted respectively, from which the product toners were removed and in which mechanisms for detecting remaining amounts of the toners were made inoperative, respectively; and evaluations were performed.

The image gloss was evaluated in a normal temperature and normal humidity environment (temperature of 25.0° C., and relative humidity of 50%).

The temperature of the fixing device was controlled at every 5° C. in a range of 160° C. and higher and 280° C. or lower, BROCHURE PAPER of 150 g GLOSSY paper (manufactured by Hewlett Packard Enterprise: 150 g/m$^2$) which was glossy paper was used as a medium, and 50 sheets of solid black image having a printing ratio of 100% were output.

The image gloss was measured at five points of the upper left of the image, the upper right of the image, the center of the image, the lower left of the image, and the lower right of the image each in the image of the first sheet, and an average value of the image glosses at the time when the average value of the image glosses at the five points became highest in the temperature range was determined as the image gloss. In addition, the controlled temperature at which the average value of the image glosses at the five points became highest was determined as the fixing temperature. In addition, the standard deviation of the image glosses at five points was used as an indicator of uniformity of the image gloss. The evaluation criteria are shown below.

<Evaluation of Image Gloss>

A: image gloss is 70 or higher.

B: image gloss is 60 or higher and lower than 70.

C: image gloss is 50 or higher and lower than 60.

D: image gloss is lower than 50.

<Evaluation of Low-Temperature Fixability>

A: fixing temperature is 190° C. or lower.

B: fixing temperature exceeds 190° C. and 200° C. or lower.

C: fixing temperature exceeds 200° C. and 210° C. or lower.

D: fixing temperature exceeds 210° C.

<Evaluation of Uniformity of Image Gloss>

A: standard deviation of image gloss is 1.5 or smaller.

B: standard deviation of image gloss exceeds 1.5 and 3.0 or smaller.

C: standard deviation of image gloss exceeds 3.0 and 4.5 or smaller.

D: standard deviation of image gloss exceeds 4.5.

In addition, it was checked whether or not the image obtained up to the 50th sheet at the fixing temperature sticked to the precedent image, and the result was used as an indicator of image loadability. The evaluation criteria are shown below.

<Evaluation of Image Loadability>

A: sticking of image is not observed.

B: slight sticking is observed between first sheet and tenth sheet.

C: slight sticking is observed between 10th sheet and 20th sheet.

D: slight sticking is observed after 20th sheet.

Furthermore, in an image obtained at a temperature between the fixing temperature and a temperature higher than that by 10° C., an offset state of the image in the rear end to the non-image portion was checked, and the offset state was used as an indicator of the releasability. The evaluation criteria are shown below.

<Evaluation of Releasability>

A: offset is not observed.

B: slight offset is observed in image obtained at fixing temperature higher than fixing temperature by 10° C.

C: slight offset is observed in image obtained at fixing temperature higher than fixing temperature by 5° C.

D: slight offset is observed in image obtained at fixing temperature.

The image in which the image gloss was checked was stored in a low-temperature and low-humidity environment (15° C./10% RH) for 30 days, and the image after storage was observed with an optical microscope and a visual inspection, and the result was used as an indicator of image storability. The evaluation criteria are shown below.

<Evaluation of Image Storability>

A: change is not observed in image.

B: slight cracks are observed with optical microscope, but cannot be visually checked.

C: cracks are observed with optical microscope but cannot be visually checked.

D: cracks are visually recognized.

TABLE 6

| | | Image gloss | | Low-temperature fixability | | Uniformity of image gloss | | | | |
|---|---|---|---|---|---|---|---|---|---|---|
| | Toner | Evaluation | Numerical value | Evaluation | Numerical value | Evaluation | Numerical value | Image loadability | Releasability | Image storability |
| Example 1 | 1 | A | 74 | A | 180 | A | 0.9 | A | A | A |
| Example 2 | 2 | A | 74 | A | 180 | A | 1.1 | A | A | A |
| Example 3 | 3 | A | 72 | A | 180 | B | 1.8 | A | A | A |
| Example 4 | 4 | B | 69 | B | 195 | A | 1.1 | B | B | A |
| Example 5 | 5 | A | 75 | A | 175 | A | 1.3 | B | A | A |
| Example 6 | 6 | A | 73 | A | 185 | B | 1.7 | A | A | A |
| Example 7 | 7 | A | 72 | B | 195 | B | 1.8 | A | A | A |
| Example 8 | 8 | A | 70 | C | 210 | B | 1.7 | A | A | A |
| Example 9 | 9 | A | 72 | C | 205 | B | 1.6 | C | A | A |
| Example 10 | 10 | A | 74 | A | 170 | B | 1.7 | B | A | A |
| Example 11 | 11 | A | 74 | A | 175 | A | 1.1 | A | A | A |
| Example 12 | 12 | A | 71 | A | 185 | A | 0.9 | A | A | A |
| Example 13 | 13 | B | 66 | B | 195 | B | 1.8 | B | A | A |
| Example 14 | 14 | C | 58 | C | 205 | B | 1.7 | A | B | A |
| Example 15 | 15 | C | 57 | C | 205 | B | 1.8 | B | A | A |
| Example 16 | 16 | A | 73 | C | 210 | B | 2.4 | C | A | A |
| Example 17 | 17 | C | 53 | C | 210 | B | 1.8 | C | B | A |
| Example 18 | 18 | A | 77 | A | 180 | B | 2.0 | A | A | A |
| Example 19 | 19 | A | 74 | A | 180 | A | 0.9 | A | A | C |
| Example 20 | 20 | B | 68 | A | 190 | C | 2.8 | A | A | C |
| Example 21 | 21 | A | 74 | A | 185 | A | 1.1 | B | B | A |
| Example 22 | 22 | A | 74 | A | 180 | A | 1.1 | A | A | A |
| Example 23 | 23 | A | 74 | A | 185 | A | 1.2 | A | A | A |
| Example 24 | 24 | A | 74 | B | 195 | A | 1.3 | A | A | A |
| Comparative Example 1 | 25 | D | 48 | C | 220 | B | 1.9 | A | A | A |
| Comparative Example 2 | 26 | D | 48 | C | 205 | B | 1.7 | A | B | B |
| Comparative Example 3 | 27 | A | 72 | C | 205 | B | 2.4 | D | A | D |
| Comparative Example 4 | 28 | C | 53 | C | 205 | B | 1.8 | D | B | A |
| Comparative Example 5 | 29 | A | 71 | C | 205 | C | 3.1 | D | A | C |
| Comparative Example 6 | 30 | D | 44 | D | 230 | C | 3.3 | C | A | C |

According to the present disclosure, there can be provided a toner which achieves both high image gloss and image loadability.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217539, filed Dec. 25, 2020, and Japanese Patent Application No. 2021-141831, filed Aug. 31, 2021, which are hereby incorporated by reference herein in their entirety.

What is claimed is:

1. A toner, comprising:

an external additive comprising a hydrotalcite; and a toner particle comprising (i) a styrene-acrylic resin having a unit represented by formula (1) and (ii) an ester compound A which is represented by formulae (2) or (3)

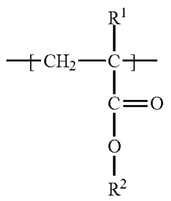

(1)

(2)

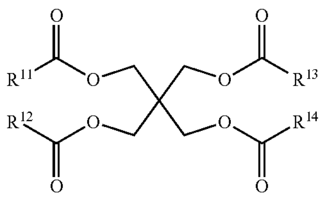

(3)

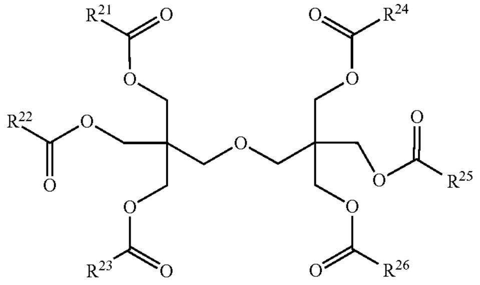

where $R^1$ represents a hydrogen atom or a methyl group, $R^2$ represents a straight-chain alkyl group having 10 to 14 carbon atoms, and $R^{11}$ to $R^{14}$ and $R^{21}$ to $R^{26}$ independently represent a straight-chain alkyl group having 15 to 21 carbon atoms, wherein an absolute value of a difference between SPb and SPw1 is 1.00 to 2.00, when SPb $(J/cm^3)^{1/2}$ is an SP value of the styrene-acrylic resin, and SPw1 $(J/cm^3)^{1/2}$ is an SP value of ester compound A.

2. The toner according to claim 1, wherein the styrene-acrylic resin comprises 1 to 15% by mass of the unit represented by formula (1) based on total mass of the styrene-acrylic resin.

3. The toner according to claim 1, wherein the toner particle comprises an ester compound B which is represented by any of formulae (4)-(6)

(4)

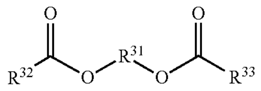

(5)

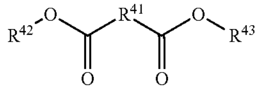

(6)

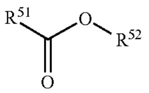

where $R^{31}$ and $R^{41}$ independently represent an alkylene group having 2 to 8 carbon atoms, and $R^{32}$, $R^{33}$, $R^{42}$, $R^{43}$, $R^{51}$ and $R^{52}$ independently represent a straight-chain alkyl group having 14 to 24 carbon atoms, and an absolute value of a difference between SPb and SPw2 is 2.10 or smaller, when SPw2 $(J/cm^3)^{1/2}$ is an SP value of ester compound B.

4. The toner according to claim 1, wherein ester compound A is represented by formulae (2') or (3')

(2')

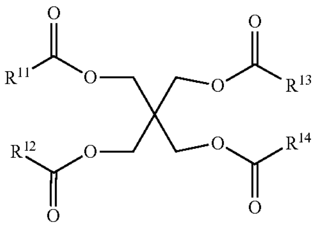

(3')

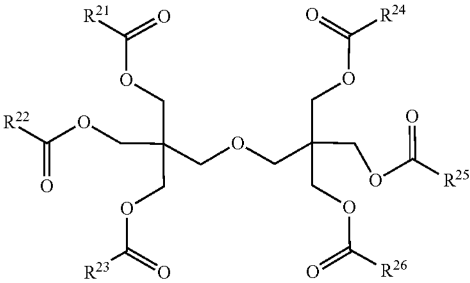

where $R^{11}$ to $R^{14}$ and $R^{21}$ to $R^{26}$ independently represent a straight-chain alkyl group having 17 to 21 carbon atoms.

5. The toner according to claim 4, wherein ester compound A is represented by formula (2').

* * * * *